US010656401B2

(12) United States Patent
Mori et al.

(10) Patent No.: US 10,656,401 B2
(45) Date of Patent: May 19, 2020

(54) OPTICAL APPARATUS, MEASURING APPARATUS, MEASURING METHOD, SCREENING APPARATUS, AND SCREENING METHOD

(71) Applicant: NIKON CORPORATION, Tokyo (JP)

(72) Inventors: Susumu Mori, Tokyo (JP); Tomoya Saito, Fuchu (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 15/100,153

(22) PCT Filed: Dec. 8, 2014

(86) PCT No.: PCT/JP2014/082386
§ 371 (c)(1),
(2) Date: Oct. 25, 2016

(87) PCT Pub. No.: WO2015/087824
PCT Pub. Date: Jun. 18, 2015

(65) Prior Publication Data
US 2017/0038572 A1 Feb. 9, 2017

(30) Foreign Application Priority Data
Dec. 9, 2013 (JP) .................. 2013-253976

(51) Int. Cl.
*G02B 21/00* (2006.01)
*G01N 21/64* (2006.01)
(Continued)

(52) U.S. Cl.
CPC ..... *G02B 21/0032* (2013.01); *G01N 21/6458* (2013.01); *G01N 21/6486* (2013.01);
(Continued)

(58) Field of Classification Search
CPC ... G01N 2021/6421; G01N 2021/6463; G01N 21/6428; G01N 21/6458;
(Continued)

(56) References Cited

U.S. PATENT DOCUMENTS 5,127,730 A * 7/1992 Brelje ............... G02B 21/0064
250/458.1
5,526,338 A * 6/1996 Hasman ............ G11B 7/0037
369/102
(Continued)

FOREIGN PATENT DOCUMENTS

JP     2002-090637     3/2002

OTHER PUBLICATIONS

International Search Report for PCT/JP2014/082386, dated Mar. 3, 2015.
(Continued)

*Primary Examiner* — Taeho Jo

(57) ABSTRACT

An optical apparatus includes a first optical element and a second optical element capable of separating incident light according to a wavelength of the incident light. The first optical element includes a first separation section having first optical characteristics for reflecting light in a first wavelength band, transmitting light in a second wavelength band, and partially transmitting and partially reflecting light in a third wavelength band. The second optical element includes a second separation section having second optical characteristics for separating incident light that is incident in two wavelength bands including the first wavelength band or the second wavelength band and the third wavelength band into the light in the first wavelength band or the light in the second wavelength band and the light in the third wavelength band according to the wavelength.

35 Claims, 14 Drawing Sheets

(51) Int. Cl.
  *G02B 21/12* (2006.01)
  *G02B 5/26* (2006.01)
  *G02B 27/14* (2006.01)
  *G02B 5/22* (2006.01)

(52) U.S. Cl.
  CPC ............ *G02B 5/26* (2013.01); *G02B 21/0064* (2013.01); *G02B 21/0076* (2013.01); *G02B 21/12* (2013.01); *G02B 27/141* (2013.01); *G01N 2021/6471* (2013.01); *G02B 5/22* (2013.01)

(58) Field of Classification Search
  CPC ... G01N 2021/6417; G01N 2021/6419; G01N 21/6486; G01N 2021/6471; G02B 21/0032; G02B 26/0833; G02B 21/002; G02B 21/02; G02B 21/0064; G02B 27/0031; G02B 27/141; G02B 5/26; G02B 21/0076; G02B 21/12; G02B 5/22
  USPC ...................................................... 250/459.1
  See application file for complete search history.

(56) References Cited

U.S. PATENT DOCUMENTS

| | | | | |
|---|---|---|---|---|
| 8,436,999 B2* | 5/2013 | Pratt | ................. | G01J 3/4406 356/432 |
| 2003/0030799 A1* | 2/2003 | Chen | ................. | G01J 3/10 356/300 |
| 2005/0167621 A1* | 8/2005 | Zeng | ................. | G01J 3/0289 250/580 |
| 2005/0203421 A1* | 9/2005 | Zeng | ................. | G01J 3/0289 600/476 |
| 2005/0203423 A1* | 9/2005 | Zeng | ................. | G01J 3/0289 600/476 |
| 2005/0231715 A1* | 10/2005 | Horigome | .......... | G01N 21/6456 356/317 |
| 2006/0289789 A1* | 12/2006 | Raymond | .......... | G01B 11/0616 250/459.1 |
| 2006/0289790 A1* | 12/2006 | Raymond | .......... | G01B 11/0616 250/459.1 |
| 2008/0239265 A1* | 10/2008 | Den Boef | ........... | G01N 21/956 355/53 |
| 2008/0278801 A1* | 11/2008 | Koike | .................... | G02B 21/16 359/385 |
| 2009/0171325 A1* | 7/2009 | Koenig | ................. | A61F 9/007 606/5 |
| 2009/0225410 A1* | 9/2009 | Fey | ......................... | G02B 21/16 359/385 |
| 2009/0250632 A1* | 10/2009 | Kempe | ............... | G01N 21/6458 250/459.1 |
| 2009/0309049 A1* | 12/2009 | Van Dijk | .................. | G01J 3/02 250/578.1 |
| 2009/0310141 A1* | 12/2009 | Miyata | ............... | G01B 9/02007 356/487 |
| 2010/0142041 A1* | 6/2010 | Berman | ............. | G02B 21/0032 359/385 |
| 2010/0193704 A1* | 8/2010 | Pratt | ...................... | G01J 3/4406 250/459.1 |
| 2010/0268499 A1* | 10/2010 | Holzapfel | ............ | G01B 9/0207 702/76 |
| 2011/0043907 A1* | 2/2011 | Sasaki | ................ | G01N 21/6458 359/388 |
| 2011/0134519 A1* | 6/2011 | Cooper | .............. | G02B 21/0032 359/385 |
| 2011/0278472 A1* | 11/2011 | Atzler | .................... | G01J 3/0291 250/459.1 |
| 2012/0080616 A1* | 4/2012 | Schoenborn | ......... | A61B 5/0059 250/459.1 |
| 2012/0089365 A1* | 4/2012 | Fay | ..................... | G01B 11/0675 702/167 |
| 2012/0268734 A1* | 10/2012 | Nishiyama | .......... | G01N 21/9501 356/237.5 |
| 2013/0010353 A1* | 1/2013 | Berman | ............. | G02B 21/0032 359/385 |
| 2013/0082180 A1* | 4/2013 | Priore | .................... | G01N 21/55 250/339.07 |
| 2013/0193345 A1* | 8/2013 | Nishiwaki | .............. | G01N 21/64 250/458.1 |
| 2013/0201322 A1* | 8/2013 | Park | ..................... | G02B 21/0064 348/80 |
| 2013/0314526 A1* | 11/2013 | Yasuda | .............. | G01N 15/1475 348/79 |
| 2014/0027653 A1* | 1/2014 | Mori | ..................... | G02B 21/16 250/458.1 |

OTHER PUBLICATIONS

Written Opinion of the International Search Authority for PCT/JP2014/082386, dated Mar. 3, 2015.
Extended European Search Report dated Jun. 26, 2017 in corresponding European Patent Application No. 14869374.0.
European Office Action dated May 23, 2019 in corresponding European Patent Application No. 14869374.0.

* cited by examiner

OPTICAL APPARATUS, MEASURING APPARATUS, MEASURING METHOD, SCREENING APPARATUS, AND SCREENING METHOD

TECHNICAL FIELD

The present invention relates to an optical apparatus, a measuring apparatus, a measuring method, a screening apparatus, and a screening method.

Priority is claimed on Japanese Patent Application No. 2013-253976, filed Dec. 9, 2013, the content of which is incorporated herein by reference.

BACKGROUND ART

For example, a measuring apparatus which chronologically performs bright field observation and fluorescence observation on one sample is known.

In this measuring apparatus, light for bright field observation is guided in a first optical path, the sample is illuminated by the light, and an image of the sample is captured by an imaging device, and excitation light for fluorescence observation is guided in a second optical path, the sample is illuminated by the excitation light, and fluorescence generated in the sample is imaged by the same imaging device. This measuring apparatus operates the filter turret to switch between non-arrangement and arrangement of a fluorescent cube at a position at which the first optical path and the second optical path overlap and accordingly to switch between bright field observation and fluorescence observation. Further, in the measuring apparatus in Patent Document 1, a technology for switching light used for measurement by rotating a turret in which a mirror unit including an excitation filter that transmits light having a predetermined wavelength is arranged in a circumferential direction, and positioning a mirror unit including an excitation filter that transmits light having a desired wavelength in an optical path of illumination light is disclosed.

CITATION LIST

Patent Literature

[Patent Document 1] Japanese Unexamined Patent Application, First Publication No. 2002-090637

SUMMARY OF INVENTION

Technical Problem

However, in the related art as described above, there are the following problems.

For example, in a case in which a plurality of measurement targets are arranged in an array form in the sample and an imaging result in the bright field observation is compared with an imaging result in the fluorescence observation so as to measure a measurement target in which fluorescence is generated, imaging areas in the sample are required to correspond to each other between both of the imaging results. However, in the related art, when the bright field observation and the fluorescence observation are switched between, rotation of the turret and positioning of a rotation direction of the turret are required. Accordingly, due to, for example, an arrangement error or an operation error of the fluorescent cube or the mirror unit, the imaging areas in the sample may not correspond to each other in both the imaging results, and measurement accuracy is likely to be degraded. In particular, in a case in which the measurement targets in the imaging area are some of all the measurement targets, in relation to the size of a field of view, strict correspondence (for example, positioning) of the imaging areas in the sample between both the imaging results is required. For example, corresponding imaging areas in the sample are required to be almost unshifted or to exactly match between both the imaging results.

An object of embodiments according to the present invention is to provide an optical apparatus, a measuring apparatus, a measuring method, a screening apparatus, and a screening method capable of suppressing degradation of measurement accuracy.

Solution to Problem

An optical apparatus of a first aspect according to the present invention includes a first optical element and a second optical element capable of separating incident light according to a wavelength of the incident light, wherein the first optical element includes a first separation section having first optical characteristics for reflecting light in a first wavelength band, transmitting light in a second wavelength band, and partially transmitting and partially reflecting light in a third wavelength band, and the second optical element includes a second separation section having second optical characteristics for separating incident light that is incident in two wavelength bands including the first wavelength band or the second wavelength band, and the third wavelength band into the light in the first wavelength band or the light in the second wavelength band, and the light in the third wavelength band, according to the wavelength.

An optical apparatus of a second aspect according to the present invention includes a first optical element, a second optical element, and a third optical element capable of separating incident light according to a wavelength of incident light, provided in one optical path, wherein the first optical element includes a first separation section including: reflecting excitation light in a first wavelength band and transmitting fluorescence in a second wavelength band, or transmitting the excitation light in the first wavelength band and reflecting the fluorescence in the second wavelength band; partially transmitting and partially reflecting bright field light in a third wavelength band; and reflecting excitation light in a fourth wavelength band and transmitting fluorescence in a fifth wavelength band, or transmitting the excitation light in the fourth wavelength band and reflecting the fluorescence in the fifth wavelength band, the second optical element includes a second separation section including transmitting fluorescence in the second wavelength band and fluorescence in the fifth wavelength band and reflecting bright field light in the third wavelength band, or reflecting the fluorescence in the second wavelength band and the fluorescence in the fifth wavelength band and transmitting the bright field light in the third wavelength band, and the third optical element includes a third separation section including reflecting the fluorescence in the second wavelength band and transmitting the fluorescence in the fifth wavelength band, or transmitting the fluorescence in the second wavelength band and reflecting the fluorescence in the fifth wavelength band.

An optical apparatus of a third aspect according to the present invention includes a first optical element, a second optical element, and a third optical element capable of separating incident light according to a wavelength of incident light, provided in one optical path, wherein the first optical element includes a first separation section including: reflecting excitation light in a first wavelength band and transmitting fluorescence in a second wavelength band, or transmitting the excitation light in the first wavelength band and reflecting the fluorescence in the second wavelength band; partially transmitting and partially reflecting bright field light in a third wavelength band; and reflecting excitation light in a fourth wavelength band and transmitting fluorescence in a fifth wavelength band, or transmitting the excitation light in the fourth wavelength band and reflecting the fluorescence in the fifth wavelength band, the second optical element includes a second separation section including transmitting bright field light in the third wavelength band and fluorescence in the fifth wavelength band and reflecting fluorescence in the second wavelength band, or reflecting the bright field light in the third wavelength band and the fluorescence in the fifth wavelength band and transmitting the fluorescence in the second wavelength band, and the third optical element includes a third separation section including reflecting the bright field light in the third wavelength band and transmitting the fluorescence in the fifth wavelength band, or transmitting the bright field light in the third wavelength band and reflecting the fluorescence in the fifth wavelength band.

An optical apparatus of a fourth aspect according to the present invention includes, in one optical path, a first optical element and a second optical element capable of separating incident light according to a wavelength of the incident light, and an imaging optical system that causes the incident light to be formed as an image on a sensor, the first optical element includes a first separation section having first optical characteristics for reflecting light in a first wavelength band, transmitting light in a second wavelength band, and partially transmitting and partially reflecting light in a third wavelength band, the second optical element includes a second separation section having second optical characteristics for separating light from the first optical element according to the wavelength, and the second optical element is arranged on the image side relative to the imaging optical system on the optical path.

A measuring apparatus of a fifth aspect of the present invention includes the optical apparatus according to the first aspect; a light source section that emits light that illuminates an irradiation target through the optical apparatus; and a sensor that receives light through the irradiation target.

A measuring apparatus of a sixth aspect of the present invention includes the optical apparatus of the second embodiment; a light source section that emits light that illuminates an irradiation target through the optical apparatus; and a sensor that receives light through the irradiation target.

A screening apparatus of a seventh aspect according to the present invention includes a bioassay device; and the measuring apparatus according to the fifth aspect or the sixth aspect.

A measuring method of an eighth aspect of the present invention includes emitting light that illuminates an irradiation target through the optical apparatus according to the first aspect or the second aspect; and receiving light through the irradiation target using a plurality of sensors.

A screening method of a ninth aspect according to the present invention includes performing a bioassay using a biochip; and measuring the biochip using the measuring method according to the eighth aspect.

Advantageous Effects of Invention

In an aspect according to the present invention, it is possible to suppress degradation in measurement accuracy according to measurement of the irradiation target.

DESCRIPTION OF EMBODIMENTS

Hereinafter, embodiments of an optical apparatus, a measuring apparatus, a measuring method, a screening apparatus, and a screening method of the present invention will be described with reference to FIGS. 1 to 19.

In the following description, an XYZ orthogonal coordinate system will be set and a position relationship among respective members will be described while referring to this XYZ orthogonal coordinate system. A predetermined direction in a horizontal plane is set to an X-axis direction, a direction orthogonal to the X-axis direction in the horizontal plane is set to a Y-axis direction, and a direction orthogonal to both of the X-axis direction and the Y-axis direction (that is, a vertical direction) is set to a Z-axis direction. Further, rotations (inclinations) about the X-axis, the Y-axis, and the Z-axis direction are set to θX, θY, and θZ directions, respectively.

<First Embodiment>

A first embodiment of an optical apparatus and a measuring apparatus will be described with reference to FIGS. 1 to 16.

First, the measuring apparatus 20 according to this embodiment will be described.

Figure 1:
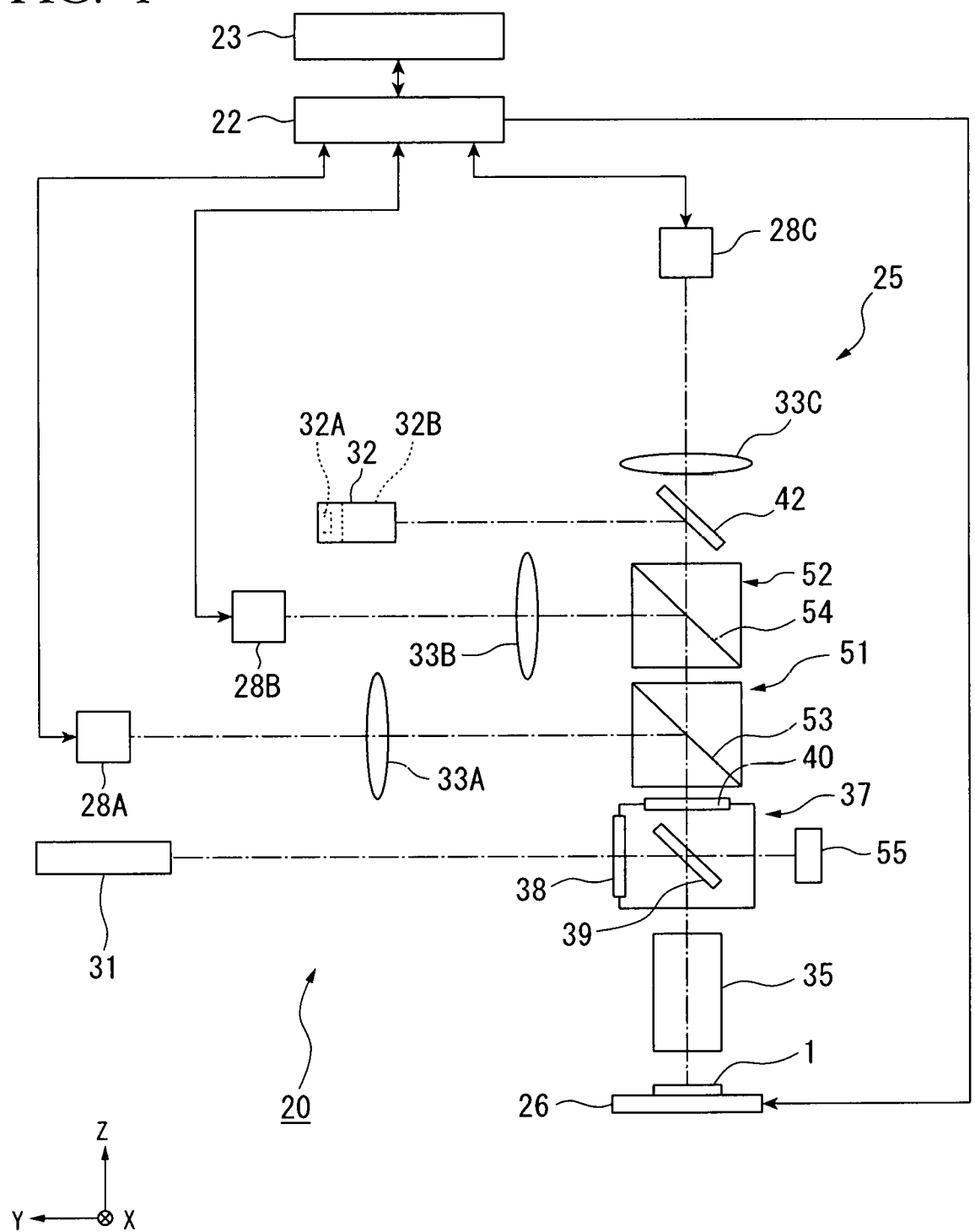
FIG. 1 is a diagram illustrating a configuration of a measuring apparatus according to a first embodiment.

FIG. 1 is a schematic configuration diagram illustrating an example of the measuring apparatus 20. The measuring apparatus 20 is an apparatus for performing measurement on an irradiation target 1. The measuring apparatus 20 includes a light source 31, a stage 26, an optical apparatus 25, a sensor 28A, a sensor 28B, a sensor 28C, a detection section 32, a sensor (optical information detection device) 55, a control section 22, a display section 23, and a main body (not illustrated). The light source 31, the stage 26, the optical apparatus 25, the sensor 28A, the sensor 28B, the sensors 28C, the detection section 32, the sensor 55, the control section 22, the display section 23, and the main body (not illustrated) are, for example, configured integrally.

The light source 31 can emit excitation light for generating fluorescence from the irradiation target 1, and a bright field light for generating reflected light from the irradiation target 1. For example, the light source 31 can output first excitation light having a wavelength λ1, second excitation light having a wavelength λ2, and a bright field light having a wavelength λ3. The light source 31 can emit light having multiple wavelengths. The wavelength λ1, the wavelength λ2, and the wavelength λ3 are different wavelengths. The light source 31 can output the first excitation light having, for example, a wavelength of 488 nm as the wavelength λ1, the second excitation light having, for example, a wavelength of 648 nm as the wavelength λ2, and the bright field light having, for example, a wavelength of 436 nm as the wavelength λ3. The light source 31 may be configured to be able to selectively switch and emit first excitation light, second excitation light, and bright field light, simultaneously emit two of the first excitation light, the second excitation light, and the bright field light, or simultaneously emit three of the first excitation light, the second excitation light, and the bright field light on the basis of a signal from the control section 22.

The optical apparatus 25 includes an objective lens 35, a filter block 37, an optical element 51, an optical element 52, a wavelength selection filter 42, an imaging optical system 33A, an imaging optical system 33B, and an imaging optical system 33C. Details of the optical apparatus 25 will be described below.

The stage 26 supports a support member 50. The stage 26 is movable in a state in which the stage 26 supports the support member 50. The stage 26 is movable, for example, in a state in which the stage 26 supports the support member 50 in an X-axis direction, a Y-axis direction, and a Z-axis direction. The stage 26 is movable, for example, in a state in which the stage 26 supports the support member 50 about the Z axis. The stage 26 is arranged on the object side of the objective lens 35.

The support member 50 supports the irradiation target 1. The support member 50 is, for example, a plate. The support member 50 is supported by the stage 26 so that a surface 18 of the irradiation target 1 faces the objective lens 35. The irradiation target 1 of the support member 50 supported by the stage 26 is irradiated with the light emitted from the light source 31 and passing through the optical apparatus 25.

The sensor 28A receives light from the irradiation target 1 via the optical apparatus 25, and outputs a signal according to the amount of received light as an image signal to the control section 22. The sensor 28A includes, for example a photodetector or an imaging device. The light detector may include, for example, a photomultiplier tube (PMT). The imaging device may include, for example a charge coupled device (CCD) or a complementary metal oxide semiconductor (CMOS).

The sensor 28B and the sensor 28C have the same configuration as the sensor 28A.

In this embodiment, the description will be given using an example in which the sensor 28A, the sensor 28B, and the sensor 28C are imaging elements (for example, sCMOS of 2048 pixels×2048 pixels).

The measuring apparatus 20 may include a cooling section for cooling the sensor 28A, the sensor 28B, and the sensor 28C. The cooling section may include, for example, a Peltier element or a device having a refrigerant. The cooling section cools the sensor 28A, the sensor 28B, and the sensor 28C in order to reduce noise (for example, dark current) caused by temperature rise of the sensor 28A, the sensor 28B, and the sensor 28C.

The detection section 32 is a device for detecting a focusing state of the measuring apparatus 20 with respect to the irradiation target 1 of the support member 50 supported by the stage 26. The detection section 32 includes a light source 32A, and a sensor 32B.

The light source 32A can emit focus detection light. The light source 32A emits, for example, infrared light having a wavelength of 770 nm as the focus detection light. The focus detection light is light in a wavelength band different from a wavelength band of any of first excitation light emitted from the light source 31, second excitation light emitted from the light source 31, bright field light emitted from the light source 31, first fluorescence generated from the irradiation target 1 by the first excitation light, and second fluorescence generated from the irradiation target 1 by the second excitation light. The focus detection light emitted from the light source 32A is radiated to the irradiation target 1 through the optical apparatus 25.

The sensor 32B receives the reflected light of the irradiation target 1 with respect to the focus detection light emitted from the light source 31A, via the optical apparatus 25, and outputs a signal according to the amount of received light to the control section 22.

The sensor 55 is a sensor for monitoring (confirming) the light output from the light source 31 so as to adjust the amount of light output by the light source 31 when measurement is performed. The sensor 55 receives the bright field light emitted from the light source 31 and transmitted through the dichroic mirror 39, and outputs a signal based on the amount of received light. On the basis of the signal output from the sensor 55, the control section 22 may adjust the amount of light with which the irradiation target 1 is irradiated by adjusting the amount of light output by the light source 31 in the case of measurement or set an exposure time (shutter speed or light reception time) of the sensors 28A and 28B and the sensor 28C in the case of measurement. The sensor 55 may detect, for example, a wavelength or an optical axis position, in addition to the light amount.

The control section 22 controls the light source 31, the stage 26, the optical apparatus 25, the sensor 28A, the sensor 28B, the sensor 28C, the detection section 32, the sensor 55, and the display section 23.

For example, the control section 22 may perform control such as control of emission of light of the light source 31, Z-axis direction position control of the stage 26 based on a detection result of the detection section 32, and driving control of the stage 26. The control section 22 performs image processing such as shading correction on respective image signals output from the sensor 28A, the sensor 28B, and the sensor 28C to generate image data. The control section 22 outputs the image data to the control section 22 so that an image based on the generated image data is displayed on the display section 23. The control section 22 is, for example, a CPU.

The display section 23 is, for example, a flat panel display such as a liquid crystal display.

The display section 23 displays an image on the basis of the image data generated by the control section 22.

The optical apparatus 25, the stage 26, the sensor 28A, the sensor 28B, the sensor 28C, the light source 31, the detection section 32, the sensor 55, the control section 22, and the display section 23 are all attached to a main body (not illustrated).

The example in which the light source 31, the stage 26, the optical apparatus 25, the sensor 28A, the sensor 28B, the sensor 28C, the detection section 32, the sensor 55, the control section 22, the display section 23, and the main body are integrally configured has been described, but the present invention is not limited thereto. For example, the control section 22 and the display section 23 may be configured as separate bodies from the measuring apparatus 20. For example, the control section 22 may be a computer such as a desktop computer, and the display section 23 may be a display (monitor) such as a liquid crystal display. For example, the control section 22 and the display section 23 may be a computer such as a laptop computer (that is, a computer terminal having a display (monitor)).

The optical apparatus 25 will be described.

The optical apparatus 25 includes an objective lens 35, a filter block (first optical element) 37, an optical element (second optical element) 51, an optical element (third optical element) 52, a wavelength selection filter (fourth optical element; fourth separation section) 42, an imaging optical system 33A, an imaging optical system 33B, and an imaging optical system 33C.

The objective lens 35 is an optical system that is located closest to the object in the optical system constituting the optical apparatus 25. The objective lens 35 is configured to be able to face the surface 18 of the irradiation target 1 supported by the stage 26. The objective lens 35 is, for example, arranged on a Z-axis positive side (upward direction) of the irradiation target 1. The objective lens 35 is, for example, an infinite system of an objective lens. The objective lens 35 is arranged, for example, on an optical path on which the light in first to fifth wavelength bands (for example, light in a wavelength band λB11B, light in a wavelength band λB12B, light in a wavelength band λB21B, and light in a wavelength band λB22B) to be described below can be incident.

The filter block 37 includes a first filter (a first wavelength selection section) 38, a dichroic mirror (a first separation section) 39, and a second filter (a second wavelength selection section) 40. For example, the filter block 37 is a fluorescence filter block in which an excitation filter, a dichroic mirror, and an absorption filter are integrally configured. The fluorescence filter block may be referred to as a fluorescent cube, a fluorescent mirror unit, or a fluorescent filter set. The light emitted by the light source 31 is incident on the filter block 37.

The measuring apparatus 20 may include a second filter block separate from the filter block 37. For example, the second filter block is a fluorescence filter block (a fluorescent cube, a fluorescent mirror unit, or a fluorescent filter set) in which an excitation filter, a dichroic mirror, and an absorption filter are integrally configured. The second filter block is used to obtain, for example, a fluorescence image according to the third fluorescence and a fluorescence image according to the fourth fluorescence. The first fluorescence, the second fluorescence, the third fluorescence, and the fourth fluorescence have different wavelengths. The dichroic mirror having the second filter block has the same spectral sensitivity characteristics as the filter block 37 with respect to at least the wavelength λ1 of the bright field light. For example, the dichroic mirror having the second filter block has a transmittance between 35% and 65% (for example, a transmittance of 50%) with respect to light in a wavelength band (for example, equal to or greater than 425 nm and smaller than 440 nm) including at least a wavelength λ1 of the bright field light (for example, a wavelength 436 nm). The filter block 37 and the second filter block are switched by a switching section, such as a turret. Accordingly, any one of the filter block 37 and the second filter block may be arranged at a position on which the light emitted by the light source 31 is incident (an optical path between the light source 31 and the objective lens 35).

The light emitted by the light source 31 is incident on the first filter 38. The first filter 38 is a wavelength selection optical element. The first filter 38 selectively transmits light having a specific wavelength. The first filter 38 selectively transmits only light in a specific wavelength band among the light emitted from the light source 31, and blocks light in bands other than the specific wavelength band, for example, through reflection or absorption. The first filter 38 selectively transmits, for example, the bright field light, the first excitation light, and the second excitation light emitted from the light source 31. The first filter 38 is an excitation filter.

Figure 2A:
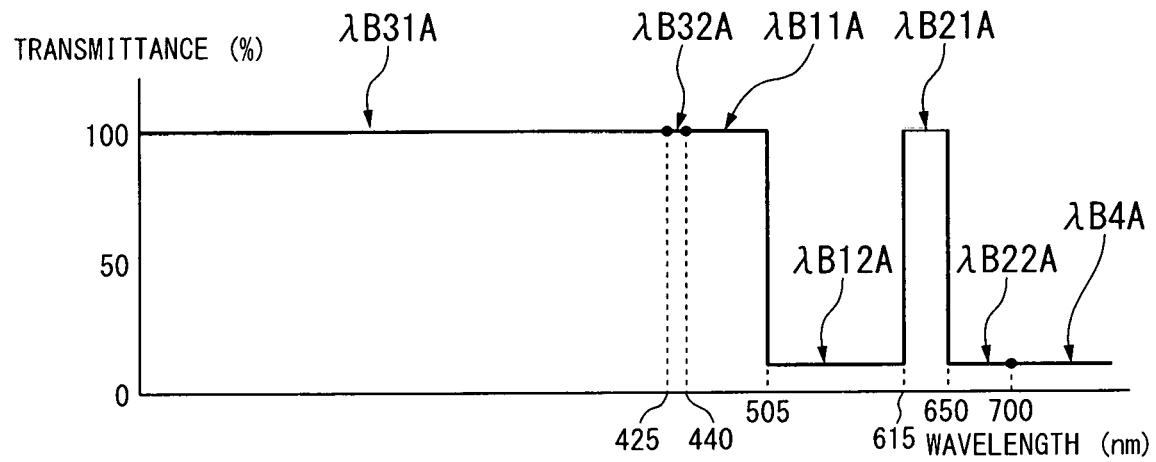
FIG. 2A is a diagram illustrating a transmittance with respect to a wavelength of light of a first filter 38 according to the first embodiment.

FIG. 2A is a diagram illustrating a transmittance of the first filter 38 with respect to a wavelength of light.

For example, the first filter 38 has a transmittance between 75% and 100% with respect to the bright field light at a wavelength λ3 emitted by the light source 31. For example, the first filter 38 has a transmittance of at least 75%, 80%, 85%, 90%, 95% or 100% with respect to the bright field light with a wavelength λ3 emitted by the light source 31. In the example of FIG. 2A, the first filter 38 has a transmittance of 100% with respect to the bright field light with a wavelength λ3 emitted by the light source 31.

For example, the first filter 38 has a transmittance between 75% and 100% with respect to the first excitation light having a wavelength λ1 emitted by the light source 31. For example, the first filter 38 has a transmittance of at least 75%, 80%, 85%, 90%, 95%, or 100% with respect to the first excitation light having a wavelength λ1 emitted by the light source 31. In the example of FIG. 2A, the first filter 38 has a transmittance of 100% with respect to the first excitation light having the wavelength λ1 emitted by the light source 31.

For example, the first filter 38 has a transmittance between 80% and 100% with respect to the second excitation light having a wavelength λ2 emitted by the light source 31. For example, the first filter 38 has a transmittance of at least 75%, 80%, 85%, 90%, 95%, or 100% with respect to the second excitation light having a wavelength λ2 emitted by the light source 31.

In the example of FIG. 2A, the first filter 38 has a transmittance of 100% with respect to the second excitation light having a wavelength λ2 emitted by the light source 31.

The first filter 38 selectively transmits light in a wavelength band λB32A including the wavelength λ3 of the bright field emitted by the light source 31, light in a wavelength band λB11A including the wavelength λ1 of the first excitation emitted by the light source 31, and the light in the wavelength band λB21A including the wavelength λ2 of the second excitation light emitted by the light source 31.

The first filter 38 transmits light in a wavelength band λB31A, transmits light in a wavelength band λB32A including the wavelength λ3 of the bright field light, transmits light in the wavelength band λB11A including the wavelength λ1 of the first excitation light, reflects the light in the wavelength band λB12A including the wavelength of a first fluorescence, transmits the light in the wavelength band λB21A including the wavelength λ2 of the second excitation light, reflects the light in the wavelength band λB22A including the wavelength of a second fluorescence, and reflects light in a wavelength band λB4A including a wavelength of infrared light.

For example, the first filter 38 has a transmittance between 75% and 100% with respect to light in the wavelength band λB31A. For example, the first filter 38 has a transmittance of at least 75%, 80%, 85%, 90%, 95% or 100% with respect to light in a wavelength band λB31A. In the example of FIG. 2A, the first filter 38 has a transmittance of 100% with respect to the light in the wavelength band λB31A.

For example, the first filter 38 has a transmittance between 75% and 100% with respect to light in the wavelength band λB32A including the wavelength λ3 of the bright field emitted by the light source 31. For example, the first filter 38 has a transmittance of at least 75%, 80%, 85%, 90%, 95% or 100% with respect to the light in the wavelength band λB32A including the wavelength λ3 of the bright field emitted by the light source 31. In the example of FIG. 2A, the first filter 38 has a transmittance of 100% with respect to the wavelength band λB32A including the wavelength λ3 of the bright field emitted by the light source 31.

For example, the first filter 38 has a transmittance between 75% with respect to light in the wavelength band λB11A including the wavelength λ1 of the first excitation emitted by the light source 31 and 100%. For example, the first filter 38 has a transmittance of at least 75%, 80%, 85%, 90%, 95% or 100% with respect to the light in the wavelength band λB11A including the wavelength λ1 of the first excitation emitted by the light source 31. In the example of FIG. 2A, the first filter 38 has a transmittance of 100% with respect to light in a wavelength band λB11A including the wavelength λ1 of the first excitation emitted by the light source 31.

For example, the first filter 38 has a transmittance between 0% and 25% with respect to light in the wavelength band λB12A including the wavelength of the first fluorescence. For example, the first filter 38 has a transmittance of at most 25%, 20%, 15%, 10%, 5%, or 0% with respect to the light in the wavelength band λB12A including the wavelength of the first fluorescence. In the example of FIG. 2A, the first filter 38 has a transmittance of 10% with respect to the light in the wavelength band λB12A including the wavelength of the first fluorescence.

For example, the first filter 38 has a transmittance between 75% and 100% with respect to light in the wavelength band λB21A including the wavelength λ2 of the second excitation emitted by the light source 31. For example, the first filter 38 has a transmittance of at least 75%, 80%, 85%, 90%, 95% or 100% with respect to the light in the wavelength band λB21A including the wavelength λ2 of the second excitation emitted by the light source 31. In the example of FIG. 2A, the first filter 38 has a transmittance of 100% with respect to the light in the wavelength band λB21A including the wavelength λ2 of the second excitation light emitted by the light source 31.

For example, the first filter 38 has a transmittance between 0% and 25% with respect to light in the wavelength band λB22A including the wavelength of the second fluorescence. For example, the first filter 38 has a transmittance of at most 25%, 20%, 15%, 10%, 5%, or 0% with respect to the light in the wavelength band λB22A including the wavelength of the second fluorescence. In the example of FIG. 2A, the first filter 38 has a transmittance of 10% with respect to the light in the wavelength band λB22A including the wavelength of the second fluorescence.

For example, the first filter 38 has a transmittance between 0% and 25% with respect to light in the wavelength band λB4A including the wavelength of focus detection light emitted by the light source 32A. For example, the first filter 38 has a transmittance of at most 25%, 20%, 15%, 10%, 5% or 0% with respect to light in a wavelength band λB4A including the wavelength of the focus detection light emitted by the light source 32A. In the example of FIG. 2A, the first filter 38 has a transmittance of 10% with respect to the wavelength band λB4A including the wavelength of the focus detection light emitted by the light source 32A.

The wavelength band λB31A is, for example, equal to or greater than 0 nm and smaller than 425 nm.

The wavelength band λB32A is a wavelength band contiguous with the wavelength band λB31A. The wavelength band λB32A is, for example, equal to or greater than 425 nm and smaller than 440 nm.

The wavelength band λB11A is a wavelength band contiguous with the wavelength band λB32A. The wavelength band λB11A is, for example, equal to or greater than 440 nm and smaller than 505 nm.

The wavelength band λB12A is a wavelength band contiguous with the wavelength band λB11A. The wavelength band λB12A is, for example, equal to or greater than 505 nm and smaller than 615 nm.

The wavelength band λB21A is a wavelength band contiguous with the wavelength band λB12A. The wavelength band λB21A is, for example, equal to or greater than 615 nm and smaller than 650 nm.

The wavelength band λB22A is a wavelength band contiguous with the wavelength band λB21A. The wavelength band λB22A is, for example, equal to or greater than 650 nm and smaller than 700 nm.

The wavelength band λB4A is a wavelength band contiguous with the wavelength band λB22A. The wavelength band λB4A is, for example, equal to or greater than 700 nm.

For example, the first filter 38 includes optical characteristics for transmitting light in a wavelength band λB31A equal to or greater than 0 nm and smaller than 425 nm, transmitting light in a wavelength band λB32A equal to or greater than 425 nm and smaller than 440 nm, transmitting light in a wavelength band λB11A equal to or greater than 440 nm and smaller than 505 nm, reflecting the light in the wavelength band λB12A equal to or greater than 505 nm and smaller than 615 nm, transmitting the light in the wavelength band λB21A equal to or greater than 615 nm and smaller than 650 nm, reflecting the light in the wavelength band λB22A equal to or greater than 650 nm and smaller than 700 nm, and reflecting light in a wavelength band λB4A equal to or greater than 700 nm.

The first filter 38 includes a band-pass filter that transmits light (the first excitation light, the second excitation light, and the bright field light) in a predetermined wavelength band and does not transmit light in other wavelength bands.

The light emitted from the light source 31 and transmitted through the first filter 38 is incident on the dichroic mirror 39. The dichroic mirror 39 is a separation optical element that mainly splits the excitation light and the fluorescence. The dichroic mirror 39 is a mirror that reflects the excitation light selected by the first filter 38 and transmits the fluorescence emitted from the irradiation target 1. The dichroic mirror 39 is arranged to be inclined, for example, at 45 degrees with respect to the optical axis.

The dichroic mirror 39 reflects the excitation light, transmits the fluorescence, and partially reflects and partially transmits the bright field light.

The dichroic mirror 39 reflects the first excitation light and the second excitation light, transmits the first fluorescence and the second fluorescence, and partially reflects and partially transmits the bright field light. The dichroic mirror 39 transmits the focus detection light.

The dichroic mirror 39 reflects light in a wavelength band (the first wavelength band) including a wavelength of the first excitation light and light in a wavelength band (the fourth wavelength band) including a wavelength of the second excitation light, transmits light in a wavelength band (the second wavelength band) including a wavelength of the first fluorescence and light in a wavelength band (the fifth wavelength band) including a wavelength of the second florescence, and partially reflects and partially transmits light in a wavelength band (the third wavelength band) including a wavelength of the bright field light. The dichroic mirror 39 transmits a wavelength band (sixth wavelength band) including the wavelength of the focus detection light.

The dichroic mirror 39 has a first transmittance with respect to the excitation light, has a second transmittance higher than the first transmittance with respect to the fluorescence, and has a third transmittance higher than the first transmittance and lower than the second transmittance with respect to the fluorescence.

The dichroic mirror 39 has a first transmittance with respect to the first excitation light and the second excitation light, has a second transmittance higher than the first transmittance with respect to the first fluorescence and the second fluorescence, and has a third transmittance higher than the first transmittance and lower than the second transmittance with respect to the bright field light. The dichroic mirror 39 has a second transmittance with respect to the focus detection light.

The dichroic mirror 39 has a first transmittance with respect to the light in the wavelength band (the first wavelength band) including the wavelength of the first excitation light and the light in the wavelength band (the fourth wavelength band) including the wavelength of the second excitation light, has a second transmittance higher than the first transmittance with respect to the light in the wavelength band (the second wavelength band) including the wavelength of the first fluorescence and the light in the wavelength band (the fifth wavelength band) including the wavelength of the second florescence, and has a third transmittance higher than the first transmittance and lower than the second transmittance with respect to the light in the wavelength band (the third wavelength band) including the wavelength of the bright field light. The dichroic mirror 39 has the second transmittance with respect to the wavelength band (sixth wavelength band) including the wavelength of the focus detection light.

The dichroic mirror 39 has, as a constant value, a first transmittance with respect to light in the entire wavelength band (the first wavelength band) including the wavelength of the first excitation light and light in the entire wavelength band (fourth wavelength band) including the wavelength of the second excitation light, has, as a constant value, a second transmittance higher than the first transmittance with respect to light in the entire wavelength band (the second wavelength band) including the wavelength of the first fluorescence and light in the entire wavelength band (fifth wavelength band) including the wavelength of the second fluorescence, and has, as a constant value, a third transmittance higher than the first transmittance and lower than the second transmittance with respect to light in the entire wavelength band (the third wavelength band) including the wavelength of the bright field light. The dichroic mirror 39 has, as a constant value, the second transmittance with respect to the entire wavelength band (sixth wavelength band) including the wavelength of the focus detection light.

For example, the optical characteristics are obtained by a multilayer film (not illustrated; see FIGS. 5A and 5B (described below) for optical characteristics) included in the dichroic mirror 39.

Figure 2B:
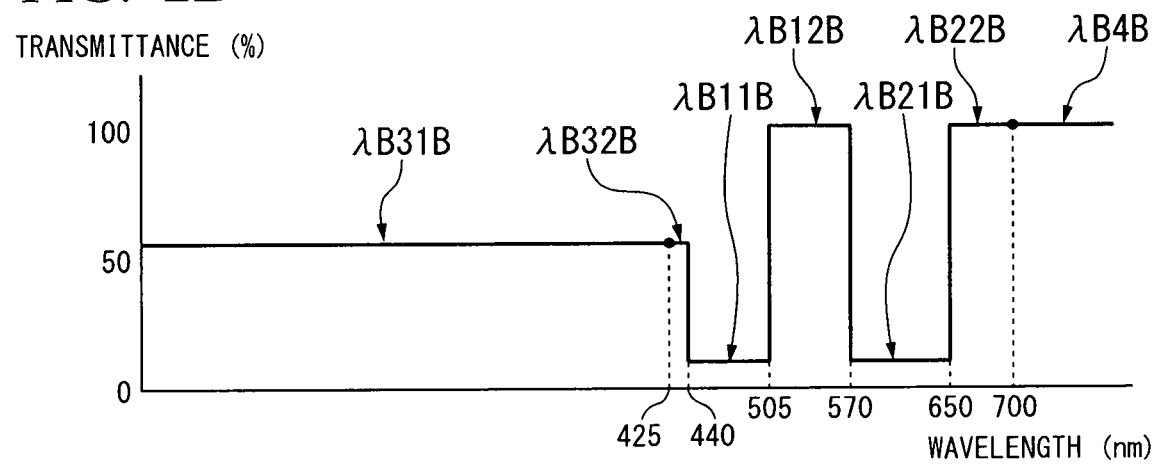
FIG. 2B is a diagram illustrating a transmittance with respect to a wavelength of light of a dichroic mirror 39 according to the first embodiment.

FIG. 2B is a diagram illustrating the transmittance of the dichroic mirror 39 with respect to the wavelength of light.

For example, the dichroic mirror 39 has a transmittance between 35% and 65% with respect to the bright field light having the wavelength λ3. For example, the dichroic mirror 39 has a transmittance of at least 35% or higher, 40% or higher, or 45% or higher with respect to the bright field light having the wavelength λ3, and has a transmittance of at most 65% or lower, 60% or lower, or 55% or lower. For example, the dichroic mirror 39 has the transmittance of any one of 35%, 40%, 45%, 50%, 55%, 60%, and 65% with respect to the bright field light having the wavelength λ3. In the example of FIG. 2B, the dichroic mirror 39 has a transmittance of 50% with respect to the bright field light having the wavelength λ3.

For example, the dichroic mirror 39 has a transmittance between 0% and 25% with respect to the first excitation light. For example, the dichroic mirror 39 has a transmittance of at most 25%, 20%, 15%, 10%, 5%, or 0% with respect to the first excitation light. In the example of FIG. 2B, the dichroic mirror 39 has a transmittance of 10% with respect to the first excitation light.

For example, the dichroic mirror 39 has a transmittance between 75% and 100% with respect to the first fluorescence. For example, the dichroic mirror 39 has a transmittance of at least 75%, 80%, 85%, 90%, 95% or 100% with respect to the first fluorescence. In the example of FIG. 2B, the dichroic mirror 39 has transmission of 100% with respect to the first fluorescence.

For example, the dichroic mirror 39 has a transmittance between 0% to 25% with respect to the second excitation light. For example, the dichroic mirror 39 has a transmittance of at most 25%, 20%, 15%, 10%, 5%, or 0% with respect to the second excitation light. In the example of FIG. 2B, the dichroic mirror 39 has a transmittance of 10% with respect to the second excitation light.

For example, the dichroic mirror 39 has a transmittance between 75% and 100% with respect to the second fluorescence. For example, the dichroic mirror 39 has a transmittance of at least 75%, 80%, 85%, 90%, 95% or 100% with respect to the second fluorescence. In the example of FIG. 2B, the dichroic mirror 39 has a transmittance of 100% with respect to the second fluorescence.

For example, the dichroic mirror 39 has a transmittance between 75% and 100% with respect to focus detection light. For example, the dichroic mirror 39 has a transmittance of at least 75%, 80%, 85%, 90%, 95% or 100% with respect to the focus detection light. In the example of FIG. 2B, the dichroic mirror 39 has a transmittance of 100% with respect to the focus detection light.

For example, the dichroic mirror 39 has a transmittance between 35% and 65% with respect to the light in the wavelength band λB31B. For example, the dichroic mirror 39 has a transmittance of at least 35% or higher, 40% or higher, or 45% or higher with respect to the light in the wavelength band λB31B, and has a transmittance of at most 65% or lower, 60% or lower, or 55% or lower. For example, the dichroic mirror 39 has a transmittance of any of 35%, 40%, 45%, 50%, 55%, 60%, and 65% with respect to the light in the wavelength band λB31B. In the example of FIG. 2B, the dichroic mirror 39 has a transmittance of 50% with respect to the light in the wavelength band λB31B.

For example, the dichroic mirror 39 has a transmittance between 35% to 65% with respect to the light in the wavelength band λB32B including the wavelength of the bright field light. For example, the dichroic mirror 39 has a transmittance of at least 35% or higher, 40% or higher, or 45% or higher, and has a transmittance of at most 65% or lower, 60% or lower, or 55% or lower with respect to the light in the wavelength band λB32B including the wavelength of the bright field light. For example, the dichroic mirror 39 has a transmittance of 35%, 40%, 45%, 50%, 55%, 60%, or 65% with respect to the light in the wavelength band λB32B including the wavelength of the bright field light. In the example of FIG. 2B, the dichroic mirror 39 has a transmittance of 50% with respect to the light in the wavelength band λB32B including the wavelength of the bright field light.

For example, the dichroic mirror 39 has a transmittance between 0% and 25% with respect to light in the wavelength band λB11B including the wavelength of the first excitation light. For example, the dichroic mirror 39 has a transmittance of at most 25%, 20%, 15%, 10%, 5%, or 0% with respect to the light in the wavelength band λB11B including the wavelength of the first excitation light. In the example of FIG. 2B, the dichroic mirror 39 has a transmittance of 10% with respect to the light in the wavelength band λB11B including the wavelength of the first excitation light.

For example, the dichroic mirror 39 has a transmittance between 75% and 100% with respect to light in the wavelength band λB12B including the wavelength of the first fluorescence. For example, the dichroic mirror 39 has a transmittance of at least 75%, 80%, 85%, 90%, 95% or 100% with respect to light in a wavelength band λB12B including the wavelength of the first fluorescence. In the example of FIG. 2B, the dichroic mirror 39 has a transmittance of 100% with respect to the light in the wavelength band λB12B including the wavelength of the first fluorescence.

For example, the dichroic mirror 39 has a transmittance between 0% and 25% with respect to light in the wavelength band λB21B including the wavelength of the second excitation light. For example, the dichroic mirror 39 has a transmittance of at most 25%, 20%, 15%, 10%, 5%, or 0% with respect to light in a wavelength band λB21B including the wavelength of the second excitation light. In the example of FIG. 2B, the dichroic mirror 39 has a transmittance of 10% with respect to the light in the wavelength band λB21B including the wavelength of the second excitation light.

For example, the dichroic mirror 39 has a transmittance between 75% and 100% with respect to light in a wavelength band λB22B including the wavelength of the second fluorescence. For example, the dichroic mirror 39 has a transmittance of at least 75%, 80%, 85%, 90%, 95% or 100% with respect to the light in the wavelength band λB22B including the wavelength of the second fluorescence. In the example of FIG. 2B, the dichroic mirror 39 has a transmittance of 100% with respect to the light in the wavelength band λB22B including the wavelength of the second fluorescence.

For example, the dichroic mirror 39 has a transmittance between 75% and 100% with respect to light in the wavelength band λB4B including the wavelength of the focus detection light. For example, the dichroic mirror 39 has a transmittance of at least 75%, 80%, 85%, 90%, 95% or 100% with respect to light in a wavelength band λB4B including the wavelength of the focus detection light. In the example of FIG. 2B, the dichroic mirror 39 has a transmittance of 100% with respect to light in a wavelength band λB4B including the wavelength of the focus detection light.

As illustrated in FIG. 2B, the dichroic mirror 39 has a constant transmittance (for example, 35%, 40%, 45%, 50%, 55%, 60%, or 65%) with respect to light in an entire wavelength band λB32B (for example, equal to or greater than 425 nm and smaller than 440 nm) including the wavelength of the bright field light.

As illustrated in FIG. 2B, the dichroic mirror 39 has a constant transmittance (for example, 35%, 40%, 45%, 50%, 55%, 60%, or 65%) with respect to light in an entire wavelength band (for example, equal to or greater than 0 nm and smaller than 440 nm) including the wavelength band λB31B and the wavelength band λB32B.

As illustrated in FIG. 2B, in the dichroic mirror 39, the transmittance with respect to light in an entire wavelength band λB32B (for example, equal to or greater than 425 nm and smaller than 440 nm) including the wavelength of the bright field light is higher than the transmittance with respect to light in the entire wavelength band λB11B (for example, equal to or greater than 440 nm and smaller than 505 nm) including the wavelength of the first excitation light.

As illustrated in FIG. 2B, in the dichroic mirror 39, the transmittance with respect to light in an entire wavelength band λB32B (for example, equal to or greater than 425 nm and smaller than 440 nm) including the wavelength of the bright field light is higher than the transmittance with respect to light in the entire wavelength band λB21B (for example, equal to or greater than 570 nm and smaller than 650 nm) including the wavelength of the second excitation light.

As illustrated in FIG. 2B, in the dichroic mirror 39, the transmittance with respect to light in an entire wavelength band λB32B (for example, equal to or greater than 425 nm and smaller than 440 nm) including the wavelength of the bright field light is higher than any of the transmittance with respect to light in the entire wavelength band λB11B (for example, equal to or greater than 440 nm and smaller than 505 nm) including the wavelength of the first excitation light and the transmittance with respect to light in the entire wavelength band λB21B (for example, equal to or greater than 570 nm and smaller than 650 nm) including the wavelength of the second excitation light.

As illustrated in FIG. 2B, in the dichroic mirror 39, the transmittance with respect to light in an entire wavelength band λB32B (for example, equal to or greater than 425 nm and smaller than 440 nm) including the wavelength of the bright field light is lower than a transmittance with respect to light in the entire wavelength band λB12B (for example, equal to or greater than 505 nm and smaller than 570 nm) including the wavelength of the first fluorescence.

As illustrated in FIG. 2B, in the dichroic mirror 39, the transmittance with respect to light in an entire wavelength band λB32B (for example, equal to or greater than 425 nm and smaller than 440 nm) including the wavelength of the bright field light is lower than the transmittance with respect to light in the entire wavelength band λB22B (for example, equal to or greater than 650 nm and smaller than 700 nm) including the wavelength of the second fluorescence.

As illustrated in FIG. 2B, in the dichroic mirror 39, the transmittance with respect to light in an entire wavelength band λB32B (for example, equal to or greater than 425 nm and smaller than 440 nm) including the wavelength of the bright field light is lower than any of the transmittance with respect to light in the entire wavelength band λB12B (for example, equal to or greater than 505 nm and smaller than 570 nm) including the wavelength of the first fluorescence and the transmittance with respect to light in the entire wavelength band λB22B (for example, equal to or greater than 650 nm and smaller than 700 nm) including the wavelength of the second fluorescence.

As illustrated in FIG. 2B, in the dichroic mirror 39, the transmittance with respect to light in an entire wavelength band (for example, equal to or greater than 0 nm and smaller than 440 nm) of the wavelength band λB31B and the wavelength band λB32B is higher than the transmittance with respect to light in the entire wavelength band λB11B (for example, equal to or greater than 440 nm and smaller than 505 nm) including the wavelength of the first excitation light.

As illustrated in FIG. 2B, in the dichroic mirror 39, the transmittance with respect to light in an entire wavelength band (for example, equal to or greater than 0 nm and smaller than 440 nm) of the wavelength band λB31B and the wavelength band λB32B is higher than the transmittance with respect to light in the entire wavelength band λB21B (for example, equal to or greater than 570 nm and smaller than 650 nm) including the wavelength of the second excitation light.

As illustrated in FIG. 2B, in the dichroic mirror 39, the transmittance with respect to light in an entire wavelength band (for example, equal to or greater than 0 nm and smaller than 440 nm) of the wavelength band λB31B and the wavelength band λB32B is higher than any of the transmittance with respect to light in the entire wavelength band λB11B (for example, equal to or greater than 440 nm and smaller than 505 nm) including the wavelength of the first excitation light and the transmittance with respect to light in the entire wavelength band λB21B (for example, equal to or greater than 570 nm and smaller than 650 nm) including the wavelength of the second excitation light.

As illustrated in FIG. 2B, the dichroic mirror 39 has a transmittance with respect to light in an entire wavelength band (for example, equal to or greater than 0 nm and smaller than 440 nm) of the wavelength band λB31B and the wavelength band λB32B is lower than a transmittance with respect to light in the entire wavelength band λB12B (for example, equal to or greater 505 nm and smaller than 570 nm) including the wavelength of the first fluorescence.

As illustrated in FIG. 2B, in the dichroic mirror 39, the transmittance with respect to light in an entire wavelength band (for example, equal to or greater than 0 nm and smaller than 440 nm) of the wavelength band λB31B and the wavelength band λB32B is lower than the transmittance with respect to light in the entire wavelength band λB22B (for example, equal to or greater than 650 nm and smaller than 700 nm) including the wavelength of the second fluorescence.

As illustrated in FIG. 2B, in the dichroic mirror 39, the transmittance with respect to light in an entire wavelength band (for example, equal to or greater than 0 nm and smaller than 440 nm) of the wavelength band λB31B and the wavelength band λB32B is lower than any of the transmittance with respect to light in the entire wavelength band λB12B (for example, equal to or greater than 505 nm and smaller than 570 nm) including the wavelength of the first fluorescence and the transmittance with respect to light in the entire wavelength band λB22B (for example, equal to or greater than 650 nm and smaller than 700 nm) including the wavelength of the second fluorescence.

A transmittance of the wavelength band λB11B and a transmittance of the wavelength band λB21B in the dichroic mirror 39 may be the same or different. In the example of FIG. 2B, both of the transmittance of the wavelength band λB11B and the transmittance of the wavelength band λB21B in the dichroic mirror 39 are the same as 10%.

A transmittance of the wavelength band λB12B, a transmittance of the wavelength band λB22B, and a transmittance of the wavelength band λB4B in the dichroic mirror 39 may be the same or different. In the example of FIG. 2B, all of the transmittance of the wavelength band λB12B, the transmittance of the wavelength band λB22B, and the transmittance of the wavelength band λB4B in the dichroic mirror 39 are the same as 100%.

The wavelength band λB31B is, for example, equal to or greater than 0 nm and smaller than 425 nm.

The wavelength band λB32B is a wavelength band contiguous with the wavelength band λB31B. The wavelength band λB32B is, for example, equal to or greater than 425 nm and smaller than 440 nm.

The wavelength band λB11B is a wavelength band contiguous with the wavelength band λB32B. The wavelength band λB11B is, for example, equal to or greater than 440 nm and smaller than 505 nm.

The wavelength band λB12B is a wavelength band contiguous with the wavelength band λB11B. The wavelength band λB12B is, for example, equal to or greater than 505 nm and smaller than 570 nm.

The wavelength band λB21B is a wavelength band contiguous with the wavelength band λB12B. The wavelength band λB21B is, for example, equal to or greater than 570 nm and smaller than 650 nm.

The wavelength band λB22B is a wavelength band contiguous with the wavelength band λB21B. The wavelength band λB22B is, for example, equal to or greater than 650 nm and smaller than 700 nm.

The wavelength band λB4B is a wavelength band contiguous with the wavelength band λB22B. The wavelength band λB4B is, for example, equal to or greater than 700 nm.

The light from the irradiation target 1 transmitted through the dichroic mirror 39 is incident on the second filter 40. The second filter 40 is a wavelength selection optical element. The second filter 40 selectively transmits light having a specific wavelength. The second filter 40 transmits light in a specific wavelength band among the light emitted from the irradiation target 1 and blocks light in bands other than the specific wavelength band, for example, through reflection or absorption. The second filter 40 selectively transmits, for example, the bright field light, the first fluorescence, and the second fluorescence. The second filter 40 is an absorption filter. The absorption filter may be referred to as an emission filter or a barrier filter.

Figure 2C:
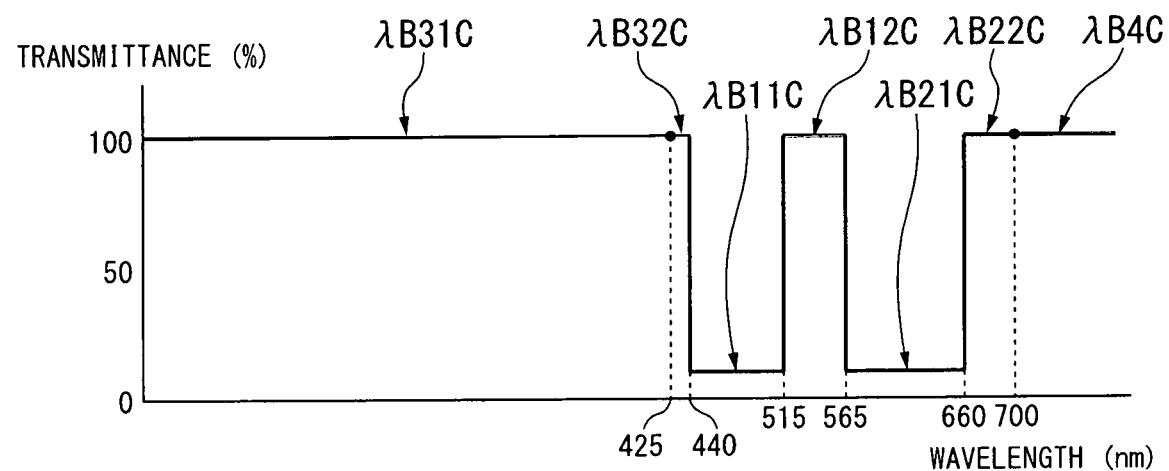
FIG. 2C is a diagram illustrating a transmittance with respect to a wavelength of light of a second filter 40 according to the first embodiment.

FIG. 2C is a diagram illustrating the transmittance of the second filter 40 with respect to the wavelength of light.

For example, the second filter 40 has a transmittance between 75% and 100% with respect to the bright field light having the wavelength $\lambda 3$. For example, the second filter 40 has a transmittance of at least 75%, 80%, 85%, 90%, 95% or 100% with respect to the bright field light having the wavelength $\lambda 3$. In the example of FIG. 2C, the second filter 40 has a transmittance of 100% with respect to the bright field light having the wavelength $\lambda 3$.

For example, the second filter 40 has a transmittance between 75% and 100% with respect to the first fluorescence. For example, the second filter 40 has a transmittance of at least 75%, 80%, 85%, 90%, 95% or 100% with respect to the first fluorescence. In the example of FIG. 2C, the second filter 40 has transmission of 100% with respect to the first fluorescence.

For example, the second filter 40 has a transmittance between 75% and 100% with respect to the second fluorescence. For example, the second filter 40 has a transmittance of at least 75%, 80%, 85%, 90%, 95% or 100% with respect to the second fluorescence. In the example of FIG. 2C, the second filter 40 has a transmittance of 100% with respect to the second fluorescence.

The second filter 40 selectively transmits the light in the wavelength band $\lambda B32C$ including the wavelength $\lambda 3$ of the bright field light, the light in the wavelength band $\lambda B12C$ including the wavelength of the first fluorescence, and the light in the wavelength band $\lambda B22C$ including the wavelength of the second fluorescence.

The second filter 40 transmits light in a wavelength band $\lambda B31C$, transmits the light in the wavelength band $\lambda B32C$ including the wavelength $\lambda 3$ of the bright field light, reflects light in a wavelength band $\lambda B11C$ including the wavelength $\lambda 1$ of the first excitation light, transmits the light in the wavelength band $\lambda B12C$ including the wavelength of the first fluorescence, reflects the light in the wavelength band $\lambda B21C$ including the wavelength $\lambda 2$ of the second excitation light, transmits light in the wavelength band $\lambda B22C$ including the wavelength of the second fluorescence, and transmits light of a wavelength band $\lambda B4C$ including a wavelength of infrared light.

For example, the second filter 40 has a transmittance between 75% and 100% with respect to light in the wavelength band $\lambda B31C$. For example, the second filter 40 has a transmittance of at least 75%, 80%, 85%, 90%, 95% or 100% with respect to the light of a wavelength band $\lambda B31C$. In the example of FIG. 2C, the second filter 40 has a transmittance of 100% with respect to the light in the wavelength band $\lambda B31C$.

For example, the second filter 40 has a transmittance between 75% and 100% with respect to the light in the wavelength band $\lambda B32C$ including the wavelength $\lambda 3$ of the bright field light. For example, the second filter 40 has a transmittance of at least 75%, 80%, 85%, 90%, 95% or 100% with respect to the light of a wavelength band $\lambda B32C$ including the wavelength $\lambda 3$ of the bright field light. In the example of FIG. 2C, the second filter 40 has a transmittance of 100% with respect to the light in the wavelength band $\lambda B32C$ including the wavelength $\lambda 3$ of the bright field light.

For example, the second filter 40 has a transmittance between 0% and 25% with respect to light in the wavelength band $\lambda B11C$ including the wavelength $\lambda 1$ of the first excitation light. For example, the second filter 40 has a transmittance of at most 25%, 20%, 15%, 10%, 5% or 0% with respect to the light of a wavelength band $\lambda B11C$ including the wavelength $\lambda 1$ of the first excitation light. In the example of FIG. 2C, the second filter 40 has a transmittance of 10% with respect to light in a wavelength band $\lambda B11C$ including the wavelength $\lambda 1$ of the first excitation light.

For example, the second filter 40 has a transmittance between 75% and 100% with respect to the light in the wavelength band $\lambda B12C$ including the wavelength of the first fluorescence. For example, the second filter 40 has a transmittance of at least 75%, 80%, 85%, 90%, 95%, or 100% with respect to the light in the wavelength band $\lambda B12C$ including the wavelength of the first fluorescence. In the example of FIG. 2C, the second filter 40 has a transmittance of 100% with respect to the light in the wavelength band $\lambda B12C$ including the wavelength of the first fluorescence.

For example, the second filter 40 has a transmittance between 0% and 25% with respect to the light in the wavelength band $\lambda B21C$ including the wavelength $\lambda 2$ of the second excitation light. For example, the second filter 40 has a transmittance of at most 25%, 20%, 15%, 10%, 5% or 0% with respect to the light of a wavelength band $\lambda B21C$ including the wavelength $\lambda 2$ of the second excitation light. In the example of FIG. 2C, the second filter 40 has a transmittance of 10% with respect to the light in the wavelength band $\lambda B21C$ including the wavelength $\lambda 2$ of the second excitation light.

For example, the second filter 40 has a transmittance between 75% and 100% with respect to light in the wavelength band $\lambda B22C$ including the wavelength of the second fluorescence. For example, the second filter 40 has a transmittance of at least 75%, 80%, 85%, 90%, 95%, or 100% with respect to the light in the wavelength band $\lambda B22C$ including the wavelength of the second fluorescence. In the example of FIG. 2C, the second filter 40 has a transmittance of 100% with respect to the light in the wavelength band $\lambda B22C$ including the wavelength of the second fluorescence.

For example, the second filter 40 has a transmittance between 75% and 100% with respect to the light in the wavelength band $\lambda B4C$ including the wavelength of the focus detection light. For example, the second filter 40 has a transmittance of at least 75%, 80%, 85%, 90%, 95%, or 100% with respect to the light in the wavelength band $\lambda B4C$ including the wavelength of the focus detection light. In the example of FIG. 2C, the second filter 40 has a transmittance of 100% with respect to the light in the wavelength band $\lambda B4C$ including the wavelength of the focus detection light.

The wavelength band $\lambda B31C$ is, for example, equal to or greater than 0 nm and smaller than 425 nm.

The wavelength band $\lambda B32C$ is a wavelength band contiguous with the wavelength band $\lambda B31C$. The wavelength band $\lambda B32C$ is, for example, equal to or greater than 425 nm and smaller than 440 nm.

The wavelength band $\lambda B11C$ is a wavelength band contiguous with the wavelength band $\lambda B32C$. The wavelength band $\lambda B11C$ is, for example, equal to or greater than 440 nm and smaller than 515 nm.

The wavelength band $\lambda B12C$ is a wavelength band contiguous with the wavelength band $\lambda B11C$. The wavelength band $\lambda B12C$ is, for example, equal to or greater than 515 nm and smaller than 565 nm.

The wavelength band λB21C is a wavelength band contiguous with the wavelength band λB12C. The wavelength band λB21C is, for example, equal to or greater than 565 nm and smaller than 660 nm.

The wavelength band λB22C is a wavelength band contiguous with the wavelength band λB21C. The wavelength band λB22C is, for example, equal to or greater than 660 nm and smaller than 700 nm.

The wavelength band λB4C is a wavelength band contiguous with the wavelength band λB22C. The wavelength band λB4C is, for example, equal to or greater than 700 nm.

For example, the second filter 40 includes optical characteristics for transmitting light in a wavelength band λB31C equal to or greater than 0 nm and smaller than 425 nm, transmitting the light in the wavelength band λB32C equal to or greater than 425 nm and smaller than 440 nm, reflecting light in a wavelength band λB11C equal to or greater than 440 nm and smaller than 515 nm, transmitting light in the wavelength band λB12C equal to or greater than 515 nm and smaller than 565 nm, reflecting the light in the wavelength band λB21C equal to or greater than 565 nm and smaller than 660 nm, transmitting the light in the wavelength band λB22C equal to or greater than 660 nm and smaller than 700 nm, and transmitting the light in the wavelength band λB4C equal to or greater than 700 nm.

The second filter 40 includes a band-pass filter that transmits light (first fluorescence, the second fluorescence, and bright field light) in a predetermined wavelength band, and does not transmit light in other wavelength bands.

The light transmitted through the filter block 37 via the irradiation target 1 is incident on the optical element 51.

The optical element 51 is a separation optical element that mainly separates bright field light and fluorescence. The optical element 51 includes a dichroic mirror (second separation section) 53. The dichroic mirror 53 mainly separates the bright field light and the fluorescence. The dichroic mirror 53 guides the bright field light to an optical path (second optical path) directed to the sensor 28A via the imaging optical system 33A and guides the fluorescence to an optical path (first optical path) directed to the optical element 52. For example, the dichroic mirror 53 reflects the bright field light and transmits the first fluorescence, the second fluorescence, and the infrared light. A dichroic mirror that reflects the first fluorescence, the second fluorescence, and the infrared light and transmits the bright field light may be used in place of the dichroic mirror 53. In this case, the measuring apparatus 20 is configured so that the first fluorescence, the second fluorescence, and the infrared light reflected by the dichroic mirror are directed to the optical element 52, and the bright field light reflected by the dichroic mirror is directed to the imaging optical system 33A.

Figure 3:
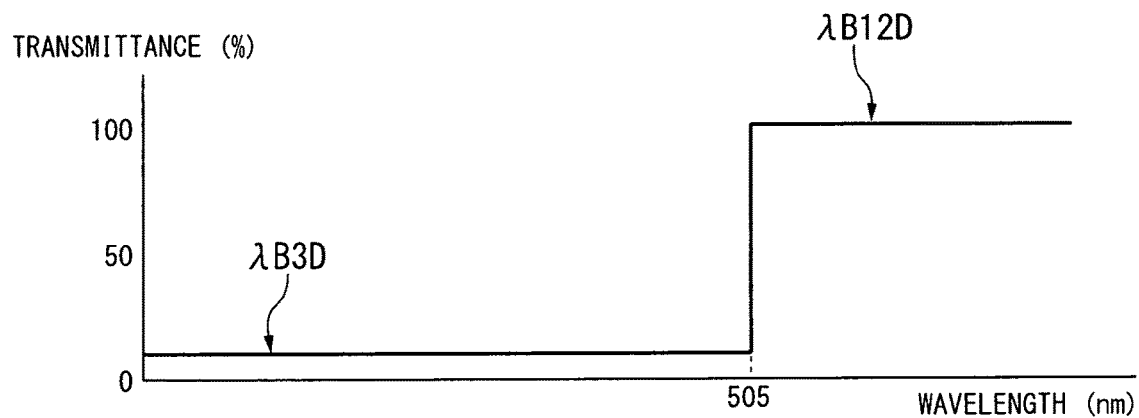
FIG. 3 is a diagram illustrating a transmittance with respect to a wavelength of light of a dichroic mirror 53 according to the first embodiment.

FIG. 3 is a diagram illustrating the transmittance of the dichroic mirror 53 with respect to the wavelength of light. As illustrated in FIG. 3, the dichroic mirror 53 has a fourth transmittance (for example, between 0% and 25%, such as 10% or 0%) with respect to light in a wavelength band λB3D including the wavelength λ3 of the bright field light transmitted through the second filter 40, and has a fifth transmittance (for example, between 75% and 100%, such as 100%) higher than the fourth transmittance with respect to light in a wavelength band λB12D including the respective wavelengths of the first fluorescence, the second fluorescence, and the infrared light transmitted through the second filter 40. In the optical characteristics of the dichroic mirror 53, a wavelength at which the wavelength band λB3D and the wavelength band λB12D are switched (a wavelength at which transmittance are switched), that is, a wavelength at which reflection and transmission of the light incident on the dichroic mirror 53 are switched is set to be the same as the wavelength at which the wavelength band λB11B and the wavelength band λB12B are switched in the optical characteristics of the dichroic mirror 39. For example, the optical characteristics are obtained by a multilayer film (not illustrated) included in the dichroic mirror 53, as in the dichroic mirror 39.

The wavelength band λB3D is, for example, equal to or greater than 0 nm and smaller than 505 nm in wavelength. The wavelength band λB12D is, for example, equal to or greater than 505 nm in wavelength.

The light transmitted through the optical element 51 via the irradiation target 1 is incident on the optical element 52. The optical element 52 is a separation optical element that mainly separates a plurality of fluorescence having different wavelengths. The optical element 52 includes a dichroic mirror (a third separation section) 54. The dichroic mirror 54 mainly separates the first fluorescence and the second fluorescence. The dichroic mirror 54 guides the first fluorescence to an optical path directed to the sensor 28B via the imaging optical system 33B, and guides the second fluorescence to an optical path directed to the sensor 28C through the wavelength selection filter 42 and the imaging optical system 33C. For example, the dichroic mirror 54 reflects the first fluorescence and transmits the second fluorescence and the infrared light. A dichroic mirror that transmits the first fluorescence and reflects the second fluorescence and the infrared light may be used in place of the dichroic mirror 54. In this case, the measuring apparatus 20 is configured so that the second fluorescence and the infrared light reflected by the dichroic mirror are directed to the wavelength selection filter 42, and first fluorescence transmitted through dichroic mirror is directed to the imaging optical system 33B.

Figure 4:
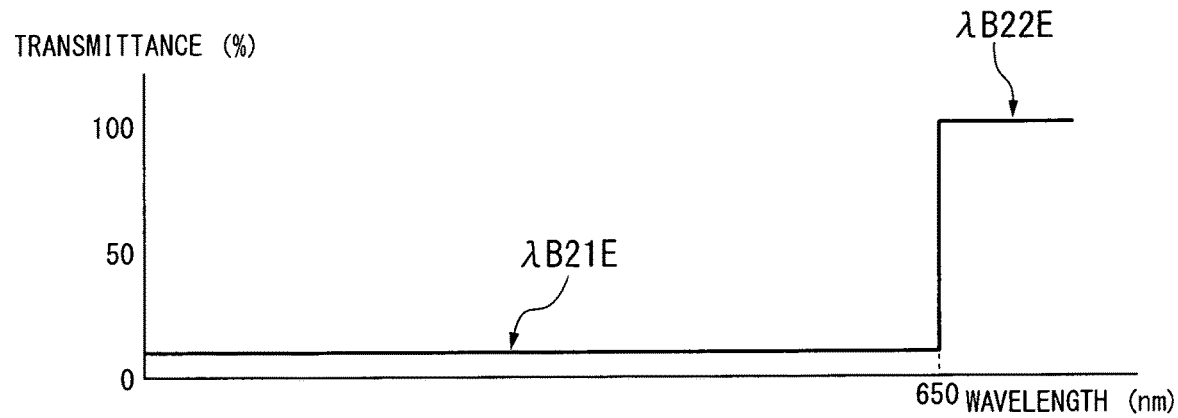
FIG. 4 is a diagram illustrating a transmittance with respect to a wavelength of light of a dichroic mirror 54 according to the first embodiment.

FIG. 4 is a diagram illustrating the transmittance of the dichroic mirror 54 with respect to the wavelength of light. As illustrated in FIG. 4, the dichroic mirror 54 has a sixth transmittance (for example, between 0% and 25%, such as 10% or 0%) with respect to light in a wavelength band λB21E including the wavelength of the first fluorescence transmitted through the dichroic mirror 53 of the optical element 51, and has a seventh transmittance (for example, between 75% and 100%, such as 100%) higher than the sixth transmission with respect to light in the wavelength band λB22E including the respective wavelengths of the second fluorescence and the infrared light transmitted through the dichroic mirror 53 of the optical element 51. For example, the optical characteristics are obtained by a multilayer film (not illustrated) included in the dichroic mirror 54, similar to the dichroic mirror 39 and the dichroic mirror 53.

The wavelength band λ1321E is, for example, equal to or greater than 0 nm and smaller than 650 nm. The wavelength band λB22E is, for example, equal to or greater than 650 nm.

The imaging optical system 33A is arranged at a position opposite to the optical element 51, and includes a plurality of optical elements such as a magnification conversion optical system or an objective lens of an imaging system. The imaging optical system 33A forms an image of the irradiation target 1 reflected by the dichroic mirror 53, near the sensor 28A. The imaging optical system 33B is arranged at a position opposite to the optical element 52, and includes a plurality of optical elements such as a magnification conversion optical system or an objective lens of an imaging system. The imaging optical system 33B forms an image of the irradiation target 1 reflected by the dichroic mirror 54, near the sensor 28B. The imaging optical system 33C is arranged at a position opposite to the optical element 52, and includes a plurality of optical elements such as a magnification conversion optical system or an objective lens of an imaging system. The imaging optical system 33C forms an image of the irradiation target 1 transmitted through the dichroic mirror 54, near the sensor 28C.

Light through the irradiation target 1 is incident on the sensor 28A, the sensor 28B, and the sensor 28C corresponding to the wavelength through the objective lens 35 and the filter block 37. In a case in which the imaging optical system 33A, the imaging optical system 33B, and the imaging optical system 33C are all considered to be around the objective lens 35, the imaging optical system is arranged on the image side relative to any of the optical element 51 (the dichroic mirror (the second separation section) 53) and the optical element 52 (the dichroic mirror (the third separation section) 54). The image of the irradiation target 1 through the objective lens 35 and the filter block 37 is formed on the sensor 28A by the imaging optical system 33A, formed on the sensor 28B by the imaging optical system 33B, and formed on the sensor 28C by the imaging optical system 33C. As a result, each of the sensor 28A, the sensor 28B, and the sensor 28C can acquire the image information of the irradiation target 1.

Spectral sensitivity characteristics of the sensor 28A may have sensitivity to any of a wavelength of the bright field light, a wavelength of the first fluorescence, and a wavelength of the second fluorescence, or may have the sensitivity to the wavelength of the bright field light without having the sensitivity to the wavelength of the first fluorescence and the wavelength of the second fluorescence among the wavelength of the bright field light, the wavelength of the first fluorescence, and the wavelength of the second fluorescence.

Spectral sensitivity characteristics of the sensor 28B may have sensitivity to any of the wavelength of the bright field light, the wavelength of the first fluorescence, and the wavelength of the second fluorescence, or may have the sensitivity to the wavelength of the first fluorescence without having the sensitivity to the wavelength of the bright field light and the wavelength of the second fluorescence among the wavelength of the bright field light, the wavelength of the first fluorescence, and the wavelength of the second fluorescence.

Spectral sensitivity characteristics of the sensor 28C may have sensitivity to any of the wavelength of the bright field light, the wavelength of the first fluorescence, and the wavelength of the second fluorescence, or may have the sensitivity to the wavelength of the second fluorescence without having the sensitivity to the wavelength of the bright field light and the wavelength of the first fluorescence among the wavelength of the bright field light, the wavelength of the first fluorescence, and the wavelength of the second fluorescence.

All of an optical path length from the irradiation target 1 to the sensor 28A, an optical path length from the irradiation target 1 to the sensor 28B, and an optical path length from the irradiation target 1 to the sensor 28C are set to be the same.

That is, the sensor 28A, the sensor 28B, the sensor 28C, the imaging optical system 33A, the imaging optical system 33B, and the imaging optical system 33C are arranged so that the optical path length of light from the irradiation target 1 incident on the sensor 28A via the objective lens 35, the filter block 37, the optical element 51, and the imaging optical system 33A, the optical path length of light from the irradiation target 1 incident on the sensor 28B via the objective lens 35, the filter block 37, the optical element 51, the optical element 52, and the imaging optical system 33B, and the optical path length of light from the irradiation target 1 incident on the sensor 28C via the objective lens 35, the filter block 37, the optical element 51, the optical element 52, the wavelength selection filter 42, and the imaging optical system 33C are the same length.

Next, the multilayer film of the dichroic mirror 39 will be described with reference to FIGS. 5A and 5B.

The dichroic mirror 39 has optical characteristics for reflecting the light in the wavelength band including the wavelength of the first excitation light and the light in the wavelength band including the wavelength of the second excitation light, transmitting the first fluorescence generated from the irradiation target 1 due to the illumination of the first excitation light, and transmitting the second fluorescence generated from the irradiation target 1 due to the illumination of the second excitation light, optical characteristics for partially transmitting and partially reflecting the light in the wavelength band including the wavelength of the bright field light, and optical characteristics for transmitting the infrared light emitted from the detection section 32, as described above. The optical characteristics of the dichroic mirror 39 are expressed by, for example, a film (for example, a multilayer film) provided on one surface (one of a plurality of surfaces or one of a pair of surfaces) of the dichroic mirror 39. In this embodiment, an example in which the optical characteristics are expressed by films respectively provided on two surfaces (two of a plurality of surfaces or both surfaces of a pair of surfaces) of the dichroic mirror 39 will be described.

Figure 5A:
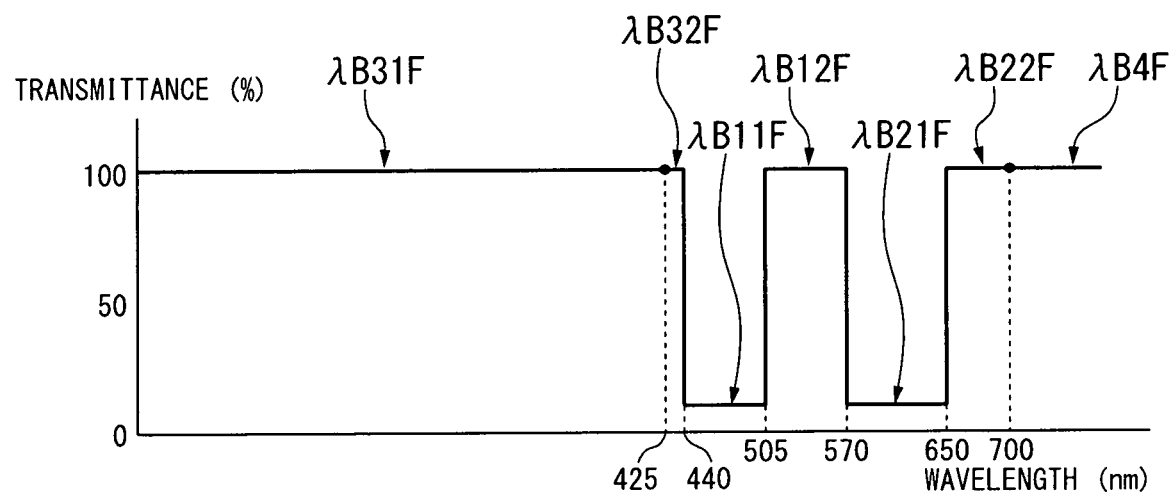
FIG. 5A is a diagram illustrating a transmittance with respect to a wavelength of light of a first multilayer film according to the first embodiment.

FIG. 5A is a diagram illustrating a transmittance of the first multilayer film provided on a first surface of the dichroic mirror 39, for example, a surface on which light emitted from the light source 31 is incident, with respect to a wavelength of light. FIG. 5B is a diagram illustrating a transmittance of the second multilayer film provided on a second surface of the dichroic mirror 39, for example, a surface on which fluorescence generated from the irradiation target 1 and transmitted through the dichroic mirror 39 is emitted.

As illustrated in FIG. In FIG. 5A, the first multilayer film has, for example, a transmittance between 75% and 100% with respect to the wavelength λ1 of the bright field light. In FIG. 5A, the first multilayer film has a transmittance of 100% with respect to the wavelength λ1 of the bright field light.

The first multilayer film has, for example, a transmittance between 0% to 25% with respect to the wavelength of the first excitation light. In FIG. 5A, the first multilayer film has a transmittance of 10% with respect to the wavelength of the first excitation light.

The first multilayer film has, for example, a transmittance between 75% and 100% with respect to a wavelength of the first fluorescence. In FIG. 5A, the first multilayer film has a transmittance of 100% with respect to the wavelength of the first fluorescence.

The first multilayer film has, for example, a transmittance between 0% to 25% with respect to the wavelength of the second excitation light. In FIG. 5A, the first multilayer film has a transmittance of 10% with respect to the wavelength of the second excitation light.

The first multilayer film has, for example, a transmittance between 75% and 100% with respect to a wavelength of the second fluorescence. In FIG. 5A, the first multilayer film has a transmittance of 100% with respect to the wavelength of the second fluorescence.

The first multilayer film has, for example, a transmittance between 75% and 100% with respect to the wavelength of the infrared light. In FIG. 5A, the first multilayer film has a transmittance of 100% with respect to the wavelength of the infrared light.

The first multilayer film has, for example, a transmittance between 75% and 100% with respect to a wavelength band λB31F. In FIG. 5A, the first multilayer film has a transmittance of 100% with respect to the wavelength band λB31F.

The first multilayer film has, for example, a transmittance between 75% and 100% with respect to a wavelength band λB32F including the wavelength of the bright field light. In FIG. 5A, the first multilayer film has a transmittance of 100% with respect to the wavelength band λB32F including the wavelength of the bright field light.

The first multilayer film has, for example, a transmittance between 0% and 25% with respect to the wavelength band λB11F including the wavelength of the first excitation light. In FIG. 5A, the first multilayer film has a transmittance of 10% with respect to the wavelength band λB11F including the wavelength of the first excitation light.

The first multilayer film has, for example, a transmittance between 75% and 100% with respect to a wavelength band λB12F including the wavelength of the first fluorescence. In FIG. 5A, the first multilayer film has a transmittance of 100% with respect to the wavelength band λB12F including the wavelength of the first fluorescence.

The first multilayer film has, for example, a transmittance between 0% and 25% with respect to the wavelength band λB21F including the wavelength of the second excitation light. In FIG. 5A, the first multilayer film has a transmittance of 10% with respect to the wavelength band λB21F including the wavelength of the second excitation light.

The first multilayer film has, for example, a transmittance between 75% and 100% with respect to a wavelength band λB22F including the wavelength of the second fluorescence. In FIG. 5A, the first multilayer film has a transmittance of 100% with respect to the wavelength band λB22F including the wavelength of the second fluorescence.

The first multilayer film has, for example, a transmittance between 75% and 100% with respect to a wavelength band λB4F including the wavelength of the infrared light. In FIG. 5A, the first multilayer film has a transmittance of 100% with respect to the wavelength band λB4F including the wavelength of the infrared light.

As illustrated in FIG. In FIG. 5A, the first multilayer film has a certain transmittance (for example, 100%) with respect to an entire wavelength band λB32F (for example, equal to or greater than 425 nm and smaller than 440 nm) including the wavelength of the bright field light.

As illustrated in FIG. In FIG. 5A, the first multilayer film has a certain transmittance (for example, 100%) with respect to the entire wavelength band (for example, equal to or greater than 0 nm and smaller than 440 nm) of the wavelength band λB31F and the wavelength band λB32F.

As illustrated in FIG. 5A, in the first multilayer film, the transmittance with respect to the entire wavelength band λB32F (for example, equal to or greater than 425 nm and smaller than 440 nm) including the wavelength of the bright field light is higher than the transmittance with respect to the entire wavelength band λB11F (for example, equal to or greater than 440 nm and smaller than 505 nm) including the wavelength of the first excitation light.

As illustrated in FIG. 5A, in the first multilayer film, the transmittance with respect to the entire wavelength band λB32F (for example, equal to or greater than 425 nm and smaller than 440 nm) including the wavelength of the bright field light is higher than the transmittance with respect to the entire wavelength band λB21F (for example, equal to or greater than 570 nm and smaller than 650 nm) including the wavelength of the second excitation light.

As illustrated in FIG. 5A, in the first multilayer film, the transmittance with respect to the entire wavelength band λB32F (for example, equal to or greater than 425 nm and smaller than 440 nm) including the wavelength of the bright field light is higher than any of the transmittance with respect to the entire wavelength band λB11F (for example, equal to or greater than 440 nm and smaller than 505 nm) including the wavelength of the first excitation light and the transmittance with respect to the entire wavelength band λB21F (for example, equal to or greater than 570 nm and smaller than 650 nm) including the wavelength of the second excitation light.

As illustrated in FIG. 5A, in the first multilayer film, the transmittance with respect to the entire wavelength band λB32F (for example, equal to or greater than 425 nm and smaller than 440 nm) including the wavelength of the bright field light is the same as the transmittance with respect to the entire wavelength band λB12F (for example, equal to or greater than 505 nm and smaller than 570 nm) including the wavelength of the first fluorescence.

As illustrated in FIG. 5A, in the first multilayer film, the transmittance with respect to the entire wavelength band λB32F (for example, equal to or greater than 425 nm and smaller than 440 nm) including the wavelength of the bright field light is the same as the transmittance with respect to the entire wavelength band λB22F (for example, equal to or greater than 650 nm and smaller than 700 nm) including the wavelength of the second fluorescence.

As illustrated in FIG. 5A, in the first multilayer film, the transmittance with respect to the entire wavelength band λB32F (for example, equal to or greater than 425 nm and smaller than 440 nm) including the wavelength of the bright field light is the same as any of the transmittance of the entire wavelength band λB12F including the wavelength of the first fluorescence (for example, equal to or greater than 505 nm and smaller than 570 nm) and the transmittance of the entire wavelength band λB22F (for example, equal to or greater than 650 nm and smaller than 700 nm) including the wavelength of the second fluorescence.

As illustrated in FIG. 5A, in the first multilayer film, the transmittance with respect to the entire wavelength band (for example, equal to or greater than 0 nm and smaller than 440 nm) of the wavelength band λB31F and the wavelength band λB32F is higher than the transmittance with respect to the entire wavelength band λB11F (for example, equal to or greater than 440 nm and smaller than 505 nm) including the wavelength of the first excitation light.

As illustrated in FIG. 5A, in the first multilayer film, the transmittance with respect to the entire wavelength band (for example, equal to or greater than 0 nm and smaller than 440 nm) of the wavelength band λB31F and the wavelength band λB32F is higher than the transmittance with respect to the entire wavelength band λB21F (for example, equal to or greater than 570 nm and smaller than 650 nm) including the wavelength of the second excitation light.

As illustrated in FIG. 5A, in the first multilayer film, the transmittance with respect to the entire wavelength band (for example, equal to or greater than 0 nm and smaller than 440 nm) of the wavelength band λB31F and the wavelength band λB32F is higher than any of the transmittance with respect to the entire wavelength band λB11F (for example, equal to or greater than 440 nm and smaller than 505 nm) including the wavelength of the first excitation light and the transmittance with respect to the entire wavelength band λB21F (for example, equal to or greater than 570 nm and smaller than 650 nm) including the wavelength of the second excitation light.

As illustrated in FIG. 5A, in the first multilayer film, the transmittance with respect to the entire wavelength band (for example, equal to or greater than 0 nm and smaller than 440 nm) of the wavelength band λB31F and the wavelength band λB32F is the same as the transmittance with respect to the entire wavelength band λB12F (for example, equal to or greater than 505 nm and smaller than 570 nm) including the wavelength of the first fluorescence.

As illustrated in FIG. 5A, in the first multilayer film, the transmittance with respect to the entire wavelength band (for example, equal to or greater than 0 nm and smaller than 440 nm) of the wavelength band λB31F and the wavelength band λB32F is the same as the transmittance with respect to the entire wavelength band λB22F (for example, equal to or greater than 650 nm and smaller than 700 nm) including the wavelength of the second fluorescence.

As illustrated in FIG. 5A, in the first multilayer film, the transmittance with respect to the entire wavelength band (for example, equal to or greater than 0 nm and smaller than 440 nm) of the wavelength band λB31F and the wavelength band λB32F is the same as any of the transmittance with respect to the entire wavelength band λB12F (equal to or greater than 505 nm and smaller than 570 nm) including the wavelength of the first fluorescence and the transmittance with respect to the entire wavelength band λB22F (for example, equal to or greater than 650 nm and smaller than 700 nm) including the wavelength of the second fluorescence.

The wavelength band λB31F is, for example, equal to or greater than 0 nm and smaller than 425 nm.

The wavelength band λB32F is a wavelength band contiguous with the wavelength band λB31F. The wavelength band λB32F is, for example, equal to or greater than 425 nm and smaller than 440 nm.

The wavelength band λB11F is a wavelength band contiguous with the wavelength band λB32F. The wavelength band λB11F is, for example, equal to or greater than 440 nm and smaller than 505 nm.

The wavelength band λB12F is a wavelength band contiguous with the wavelength band λB11F. The wavelength band λB12F is, for example, equal to or greater than 505 nm and smaller than 570 nm.

The wavelength band λB21F is a wavelength band contiguous with the wavelength band λ1312F. The wavelength band λB21F is, for example, equal to or greater than 570 nm and smaller than 650 nm.

The wavelength band λB22F is a wavelength band contiguous with the wavelength band λB21F. The wavelength band λB22F is, for example, equal to or greater than 650 nm and smaller than 700 nm.

The wavelength band λB4F is a wavelength band contiguous with the wavelength band λB22F. The wavelength band λB4F is, for example, equal to or greater than 700 nm.

Figure 5B:
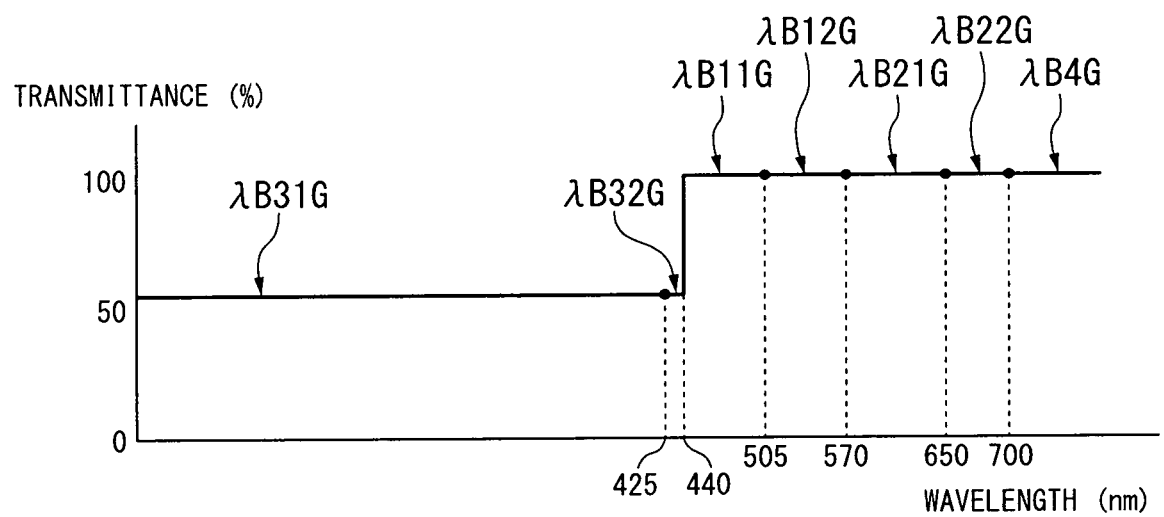
FIG. 5B is a diagram illustrating a transmittance with respect to a wavelength of light of a second multilayer film according to the first embodiment.

As illustrated in FIG. 5B, the second multilayer film has, for example, a transmittance between 35% and 65% with respect to the wavelength λ1 of the bright field light. In FIG. 5B, the second multilayer film has a transmittance of 50% with respect to the wavelength λ1 of the bright field light.

The second multilayer film has, for example, a transmittance between 75% and 100% with respect to a wavelength of the first excitation light. In FIG. 5B, the second multilayer film has a transmittance of 100% with respect to the wavelength of the first excitation light.

The second multilayer film has, for example, a transmittance between 75% and 100% with respect to a wavelength of the first fluorescence. In FIG. 5B, the second multilayer film has a transmittance of 100% with respect to the wavelength of the first fluorescence.

The second multilayer film has, for example, a transmittance between 75% and 100% with respect to a wavelength of the second excitation light. In FIG. 5B, the second multilayer film has a transmittance of 100% with respect to the wavelength of the second excitation light.

The second multilayer film has, for example, a transmittance between 75% and 100% with respect to a wavelength of the second fluorescence. In FIG. 5B, the second multilayer film has a transmittance of 100% with respect to the wavelength of the second fluorescence. The second multilayer film has, for example, a transmittance between 75% and 100% with respect to the wavelength of the infrared light. In FIG. 5B, the second multilayer film has a transmittance of 100% with respect to the wavelength of the infrared light.

The second multilayer film has, for example, a transmittance between 35% and 65% with respect to a wavelength band λB31G. In FIG. 5B, the second multilayer film has a transmittance of 50% with respect to the wavelength band λB31G.

The second multilayer film has, for example, a transmittance between 35% and 65% with respect to a wavelength band λB32G including the wavelength of the bright field light. In FIG. 5B, the second multilayer film has a transmittance of 50% with respect to the wavelength band λB32G including the wavelength of the bright field light.

The second multilayer film has, for example, a transmittance between 75% and 100% with respect to a wavelength band λB11G including the wavelength of the first excitation light.

In FIG. 5B, the second multilayer film has a transmittance of 100% with respect to the wavelength band λB11G including the wavelength of the first excitation light.

The second multilayer film has, for example, a transmittance between 75% and 100% with respect to a wavelength band λB12G including the wavelength of the first fluorescence. In FIG. 5B, the second multilayer film has a transmittance of 100% with respect to the wavelength band λB12G including the wavelength of the first fluorescence.

The second multilayer film has, for example, a transmittance between 75% and 100% with respect to a wavelength band λB21G including the wavelength of the second excitation light. In FIG. 5B, the second multilayer film has a transmittance of 100% with respect to the wavelength band λB21G including the wavelength of the second excitation light.

The second multilayer film has, for example, a transmittance between 75% and 100% with respect to a wavelength band λB22G including the wavelength of the second fluorescence. In FIG. 5B, the second multilayer film has a transmittance of 100% with respect to the wavelength band λB22G including the wavelength of the second fluorescence.

The second multilayer film has, for example, a transmittance between 75% and 100% with respect to a wavelength band λB4G including the wavelength of the infrared light. In FIG. 5B, the second multilayer film has a transmittance of 100% with respect to the wavelength band λB4G including the wavelength of the infrared light.

As illustrated in FIG. 5B, the second multilayer film has a constant transmittance (for example, 50%) with respect to the entire wavelength band λB32G (for example, equal to or greater than 425 nm and smaller than 440 nm) including the wavelength of the bright field light.

As illustrated in FIG. 5B, the second multilayer film has a constant transmittance (for example, 50%) with respect to the entire wavelength band (for example, equal to or greater than 0 nm and smaller than 440 nm) of the wavelength band λB31G and the wavelength band λB32G As illustrated in FIG. 5B, in the second multilayer film, the transmittance with respect to the entire wavelength band λB32G (for example, equal to or greater than 425 nm and smaller than 440 nm) including the wavelength of the bright field light is lower than the transmittance with respect to the entire wavelength band λB11G (for example, equal to or greater than 440 nm and smaller than 505 nm) including the wavelength of the first excitation light.

As illustrated in FIG. 5B, in the second multilayer film, the transmittance with respect to the entire wavelength band λB32G (for example, equal to or greater than 425 nm and smaller than 440 nm) including the wavelength of the bright field light is lower than a transmittance with respect to the entire wavelength band λB21G (for example, equal to or greater than 570 nm and smaller than 650 nm) including the wavelength of the second excitation light.

As illustrated in FIG. 5B, in the second multilayer film, the transmittance with respect to the entire wavelength band λB32G (for example, equal to or greater than 425 nm and smaller than 440 nm) including the wavelength of the bright field light is lower than any of a transmittance with respect to the entire wavelength band λB11G (for example, equal to or greater than 440 nm and smaller than 505 nm) including the wavelength of the first excitation light and a transmittance with respect to the entire wavelength band λB21G (for example, equal to or greater than 570 nm and smaller than 650 nm) including the wavelength of the second excitation light.

As illustrated in FIG. 5B, in the second multilayer film, the transmittance with respect to the entire wavelength band λB32G (for example, equal to or greater than 425 nm and smaller than 440 nm) including the wavelength of the bright field light is lower than the transmittance with respect to the entire wavelength band λB12G (for example, equal to or greater than 505 nm and smaller than 570 nm) including the wavelength of the first fluorescence.

As illustrated in FIG. 5B, in the second multilayer film, the transmittance with respect to the entire wavelength band λB32G (for example, equal to or greater than 425 nm and smaller than 440 nm) including the wavelength of the bright field light is lower than the transmittance with respect to the entire wavelength band λB22G (for example, equal to or greater than 650 nm and smaller than 700 nm) including the wavelength of the second fluorescence.

As illustrated in FIG. 5B, in the second multilayer film, the transmittance with respect to the entire wavelength band λB32G (for example, equal to or greater than 425 nm and smaller than 440 nm) including the wavelength of the bright field light is lower than any of the transmittance with respect to the entire wavelength band λB12G including the wavelength of the first fluorescence (for example, equal to or greater than 505 nm and smaller than 570 nm) and the transmittance with respect to the entire wavelength band λB22G (for example, equal to or greater than 650 nm and smaller than 700 nm) including the wavelength of the second fluorescence.

As illustrated in FIG. 5B, in the second multilayer film, the transmittance with respect to the entire wavelength band (for example, equal to or greater than 0 nm and smaller than 440 nm) of the wavelength band λB31G and the wavelength band λB32G is lower than the transmittance with respect to the entire wavelength band λB11G (for example, equal to or greater than 440 nm and smaller than 505 nm) including the wavelength of the first excitation light.

As illustrated in FIG. 5B, in the second multilayer film, the transmittance with respect to the entire wavelength band (for example, equal to or greater than 0 nm and smaller than 440 nm) of the wavelength band λB31G and the wavelength band λB32G is lower than a transmittance with respect to the entire wavelength band λB21G (for example, equal to or greater than 570 nm and smaller than 650 nm) including the wavelength of the second excitation light.

As illustrated in FIG. 5B, in the second multilayer film, the transmittance with respect to the entire wavelength band (for example, equal to or greater than 0 nm and smaller than 440 nm) of the wavelength band λB31G and the wavelength band λB32G is lower than any of a transmittance with respect to the entire wavelength band λB11G (for example, equal to or greater than 440 nm and smaller than 505 nm) including the wavelength of the first excitation light and a transmittance with respect to the entire wavelength band λB21G (for example, equal to or greater than 570 nm and smaller than 650 nm) including the wavelength of the second excitation light.

As illustrated in FIG. 5B, in the second multilayer film, the transmittance with respect to the entire wavelength band (for example, equal to or greater than 0 nm and smaller than 440 nm) of the wavelength band λB31G and the wavelength band λB32G is lower than the transmittance with respect to the entire wavelength band λB12G (for example, equal to or greater than 505 nm and smaller than 570 nm) including the wavelength of the first fluorescence.

As illustrated in FIG. 5B, in the second multilayer film, the transmittance with respect to the entire wavelength band (for example, equal to or greater than 0 nm and smaller than 440 nm) of the wavelength band λB31G and the wavelength band λB32G is lower than the transmittance with respect to the entire wavelength band λB22G (for example, equal to or greater than 650 nm and smaller than 700 nm) including the wavelength of the second fluorescence.

As illustrated in FIG. 5B, in the second multilayer film, the transmittance with respect to the entire wavelength band (for example, equal to or greater than 0 nm and smaller than 440 nm) of the wavelength band λB31G and the wavelength band λB32G is lower than any of a transmittance with respect to the entire wavelength band λB12G (for example, equal to or greater than 505 nm and smaller than 570 nm) including the wavelength of the first fluorescence and a transmittance with respect to the entire wavelength band λB22G (for example, equal to or greater than 650 nm and smaller than 700 nm) including the wavelength of the second fluorescence.

The wavelength band λB31G is, for example, equal to or greater than 0 nm and smaller than 425 nm.

The wavelength band λB32G is a wavelength band contiguous with the wavelength band λB31G. The wavelength band λB32G is, for example, equal to or greater than 425 nm and smaller than 440 nm.

The wavelength band λB11G is a wavelength band contiguous with the wavelength band λB32G. The wavelength band λB11G is, for example, equal to or greater than 440 nm and smaller than 505 nm.

The wavelength band λB12G is a wavelength band contiguous with the wavelength band λB11G. The wavelength band λB12G is, for example, equal to or greater than 505 nm and smaller than 570 nm.

The wavelength band λB21G is a wavelength band contiguous with the wavelength band λB12G. The wavelength band λB21G is, for example, equal to or greater than 570 nm and smaller than 650 nm.

The wavelength band λB22G is a wavelength band contiguous with the wavelength band λB21G. The wavelength band λB22G is, for example, equal to or greater than 650 nm and smaller than 700 nm.

The wavelength band λB4G is a wavelength band contiguous with the wavelength band λB22G. The wavelength band λB4G is, for example, equal to or greater than 700 nm.

The bright field light emitted from the light source 31 and transmitted through the first filter 38 is transmitted through the first multilayer film in the dichroic mirror 39 and then partially reflected and partially transmitted in the second multilayer film. The partially reflected bright field light is transmitted through the objective lens 35, and then, radiated to the surface 18 of the irradiation target 1. The bright field light reflected by the surface 18 of the irradiation target 1 is transmitted through the objective lens 35, transmitted through the first multilayer film in the dichroic mirror 39, and then, partially reflected and partially transmitted in the second multilayer film. The partially transmitting bright field light is transmitted through the second filter 40.

First excitation light emitted from the light source 31 and transmitted through the first filter 38 is reflected (totally reflected) by the first multilayer film in the dichroic mirror 39, transmitted through the objective lens 35, and then radiated to the surface 18 of the irradiation target 1. The first fluorescence generated in the irradiation target 1 by the illumination of the first excitation light is transmitted through the objective lens 35, transmitted through the first multilayer film and the second multilayer film in the dichroic mirror 39, and then transmitted through the second filter 40.

The second excitation light emitted from the light source 31 and transmitted through the first filter 38 is reflected (totally reflected) by the first multilayer film in the dichroic mirror 39, transmitted through the objective lens 35, and then radiated to the surface 18 of the irradiation target 1. The second fluorescence generated in the irradiation target 1 by the illumination of the second excitation light is transmitted through the objective lens 35, transmitted through the first multilayer film and the second multilayer film in the dichroic mirror 39, and then transmitted through the second filter 40.

Thus, in the dichroic mirror 39, the first multilayer film and the second multilayer film can cooperate to express optical characteristics illustrated in FIG. 2B.

Both of the first multilayer film and the second multilayer film are multilayer films in which dielectric films having different refractive indexes are laminated. Examples of a combination of the dielectric films constituting the multilayer film may include a silicon oxide film and a tantalum oxide film, a silicon oxide film and a niobium oxide film, and a silicon oxide film and a titanium oxide film.

As a method of forming the dielectric film, a known film forming method such as a sputtering method, a vacuum deposition method, or an ion plating method may be used. Optical characteristics of the first multilayer film and the second multilayer film can be designed using software that calculates the optical characteristics. As the software that calculates the optical characteristics, for example, TFCalc (manufactured by Software Spectra, Inc.) or OptiLayer (OptiLayer, LTd) may be used.

Figure 6A:
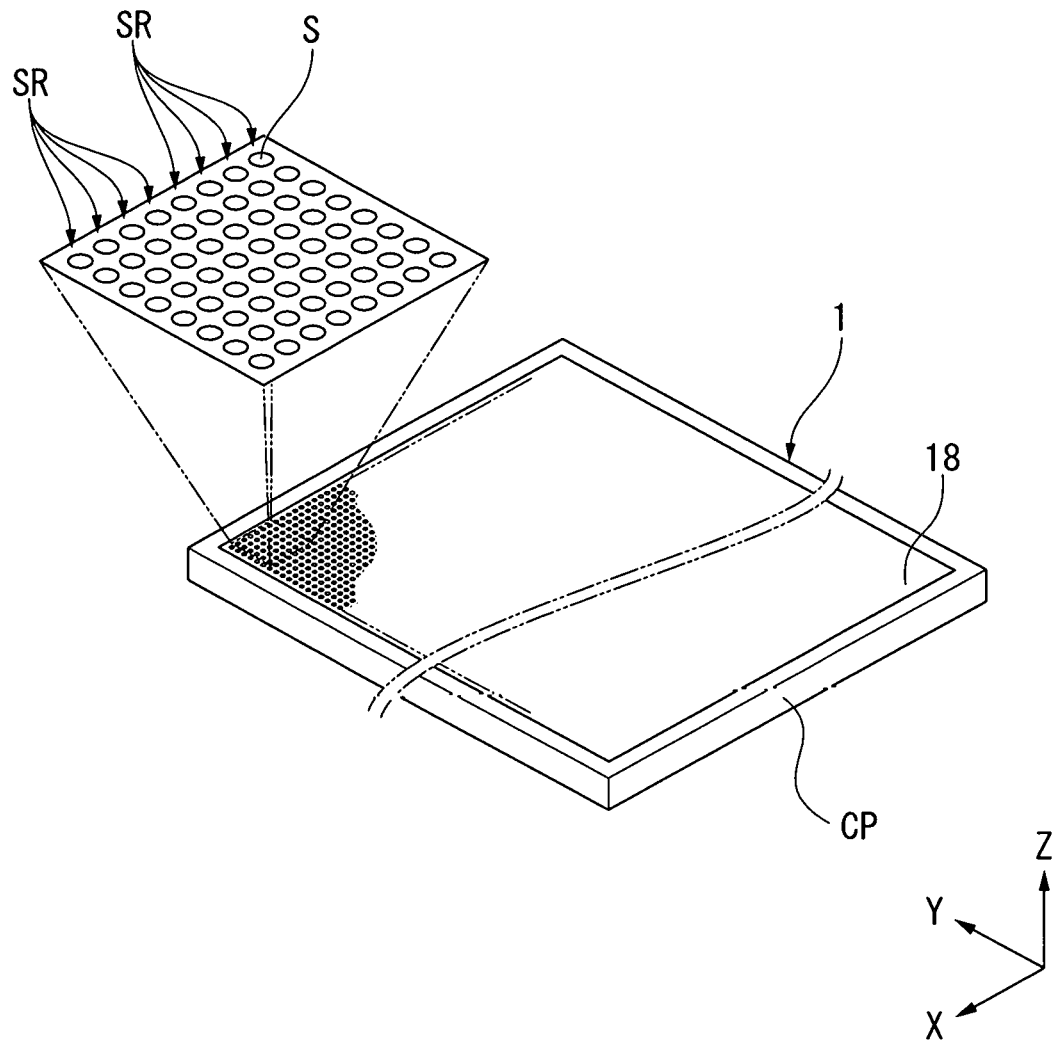
FIG. 6A is a diagram illustrating an example of an irradiation target 1 according to the first embodiment.
Figure 6B:
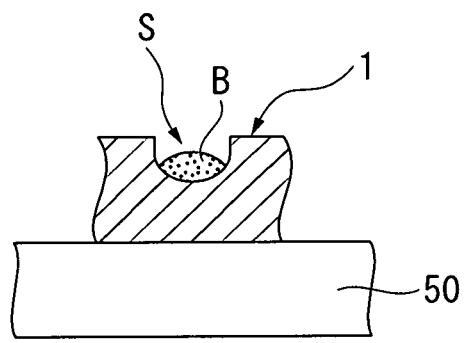
FIG. 6B is an enlarged sectional view illustrating an example of the irradiation target 1 according to the first embodiment.

FIG. 6A is a diagram schematically illustrating the irradiation target 1. FIG. 6B is a partially enlarged sectional view of a section of the irradiation target 1 and the support member 50.

The irradiation target 1 is, for example, a biochip. In the biochip, a biomolecule is fixed to a substrate CP as a probe B. The biochip may be referred to as a microarray.

The biomolecule specifically reacts with a target contained in a specimen (for example, entire blood or serum).

The biochip may also be referred to a device for detecting the target. The biochip has a plurality of spots S to which the biomolecule is fixed as a probe. The spot S is formed, for example, in a circular shape in a plan view. A plurality of spot lines SR in which spots S are arranged in a line shape are formed in the biochip. Accordingly, in the biochip, a plurality of spots S are formed in a matrix form on a surface of the substrate CP. An address is set in each spot S so that the spot S can be identified. The address is stored, for example, in a storage section of the control section 22. The substrate CP is, for example, a plate-like member. The substrate CP is formed of, for example in a rectangular (square or oblong) shape. The biochip that is the irradiation target 1 is supported by the support member 50.

In a case in which the target is fluorescently marked with a fluorescent dye, the spot S at which substance of the probe (biomolecule) and substance of the target (specimen) are bonded is irradiated with the excitation light to generate fluorescence.

The fluorescent mark generates, for example, the first fluorescence, the second fluorescence, the third fluorescence, and the fourth fluorescence. The first fluorescence, the second fluorescence, the third fluorescence, and the fourth fluorescence have different wavelengths.

An alignment mark AM is formed in the biochip. A range of the biochip that can be imaged by the sensor 28A is limited by a field of view of the objective lens 35, a size of an imaging surface of the sensor 28A, or the like. Accordingly, in a case in which images of the all spot S formed in the biochip are formed on the sensor 28A, all spots S formed on the biochip can be imaged at one time, whereas in a case in which images of the all spot S formed in the biochip are not formed on the sensor 28A, all spots S formed on the biochip cannot be imaged at one time, and imaging is required to be performed multiple times in order to image all the spots S formed on the biochip. The same applies to the sensor 28B and the sensor 28C.

Therefore, an alignment mark AM is arranged in the biochip so that the alignment mark AM is included in an imaging range of imaging multiple times. The alignment mark AM may be used as an indicator when an image in which image data of imaging multiple times are combined is generated.

Figure 7:
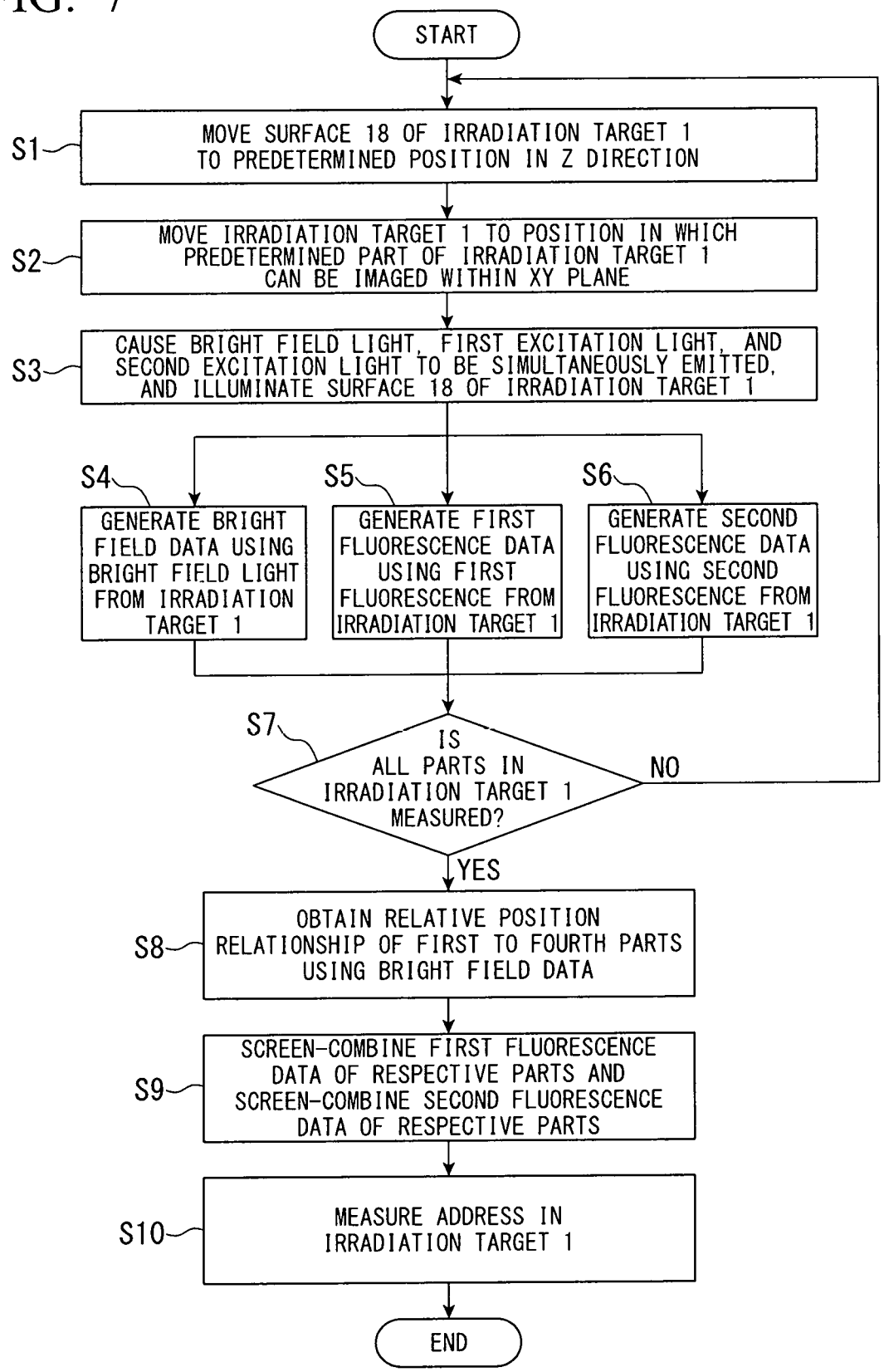
FIG. 7 is a flowchart of a measuring method according to the first embodiment.

Next, a method in which the measuring apparatus 20 measures the irradiation target 1 will be described with reference to a flowchart illustrated in FIG. 7. The flowchart illustrated in FIG. 7 is, for example, a sequence executed by a program held in the control section 22. Herein, a case in which the irradiation target 1 is a biochip, and the biochip is divided into four parts (a first part, a second part, a third part, and a fourth part) and imaged will be described.

First, the measuring apparatus 20 detects position information of the surface 18 of the irradiation target 1 in a Z (optical axis) direction using focus detection light emitted by the light source 32A of the detection section 32. The focus detection light emitted from the light source 32A of the detection section 32 is reflected in the wavelength selection filter 42, transmitted through the dichroic mirror 54 of the optical element 52, transmitted through the dichroic mirror 53 of the optical element 51, transmitted through the second filter 40 of the filter block 37, transmitted through the dichroic mirror 39, transmitted through the objective lens 35, reflected by the surface 18 of the irradiation target 1, and then, received by the sensor 32B of the detection section 32 along the same optical path as the optical path until the infrared light emitted by the light source 32A of the detection section 32 is emitted reaches the irradiation target 1. The control section 22 performs control to move the stage 26 (that is, the surface 18 of the irradiation target 1) to a predetermined position in the Z-axis direction on the basis of the position information in a Z-axis direction detected by the detection section 32 (step S1).

If the surface 18 of the irradiation target 1 is moved to the predetermined position in the Z axis direction, the measuring apparatus 20 moves the irradiation target 1 (the stage 26) to a first imaging area in which the first part can be measured in the irradiation target 1 including predetermined (a predetermined number) spots S within an XY plane (step S2).

The control section 22 in the measuring apparatus 20 causes the bright field light, the first excitation light, and the second excitation light to be simultaneously emitted from the light source 31, and illuminate the surface 18 of the irradiation target 1 (step S3). The bright field light emitted from the light source 31 is transmitted through the first filter 38, separated into reflected light (partially reflected light) and transmitted light (partially transmitted light) by the dichroic mirror 39, and partially reflected and partially transmitted. The partially reflected bright field light is transmitted through the objective lens 35 and illuminates the surface 18 of the irradiation target 1. The bright field light reflected by the surface 18 of the irradiation target 1 is transmitted through the objective lens 35, partially transmitted through the dichroic mirror 39, transmitted through the second filter 40, and incident on the optical element 51.

The first excitation light emitted from the light source 31 is transmitted through the first filter 38, reflected by the dichroic mirror 39, and transmitted through the objective lens 35. Then, the first excitation light illuminates the surface 18 of the irradiation target 1. In the spot S at which substance of the probe (biomolecule) and substance of the target (specimen) are bonded among the spots S irradiated with the first excitation light, the first fluorescence generated at a wavelength included in the wavelength band λB12B (λB12F) is transmitted through the objective lens 35, transmitted through the dichroic mirror 39 of the filter block 37, transmitted through the second filter 40, and incident on the optical element 51.

The second excitation light emitted from the light source 31 is transmitted through the first filter 38, reflected by the dichroic mirror 39, and transmitted through the objective lens 35. Then, the second excitation light illuminates the surface 18 of the irradiation target 1. In the spot S at which substance of the probe (biomolecule) and substance of the target (specimen) are bonded among the spots S irradiated with the second excitation light, the second fluorescence generated at a wavelength included in the wavelength band λB22B (λB22F) is transmitted through the objective lens 35, transmitted through the dichroic mirror 39 of the filter block 37, transmitted through the second filter 40, and incident on the optical element 51.

Among the incident light including the bright field light, the first fluorescence, and the second fluorescence incident on the optical element 51, the bright field light is reflected by the dichroic mirror 53, guided to the imaging optical system 33A, and then incident on the sensor 28A.

The sensor 28A images the first part which is a part of the biochip using the bright field light and generates bright field data (step S4). The sensor 28A receives the reflected light of the irradiation target 1 with respect to the bright field light emitted by the light source 31 and generates the bright field data. Therefore, the bright field data includes position information and luminance information of all the spots S included in the first part, and position information and luminance information of all the alignment marks AM included in the first part. The bright field data generated by the sensor 28A is stored, for example, in the control section 22.

Figure 8:
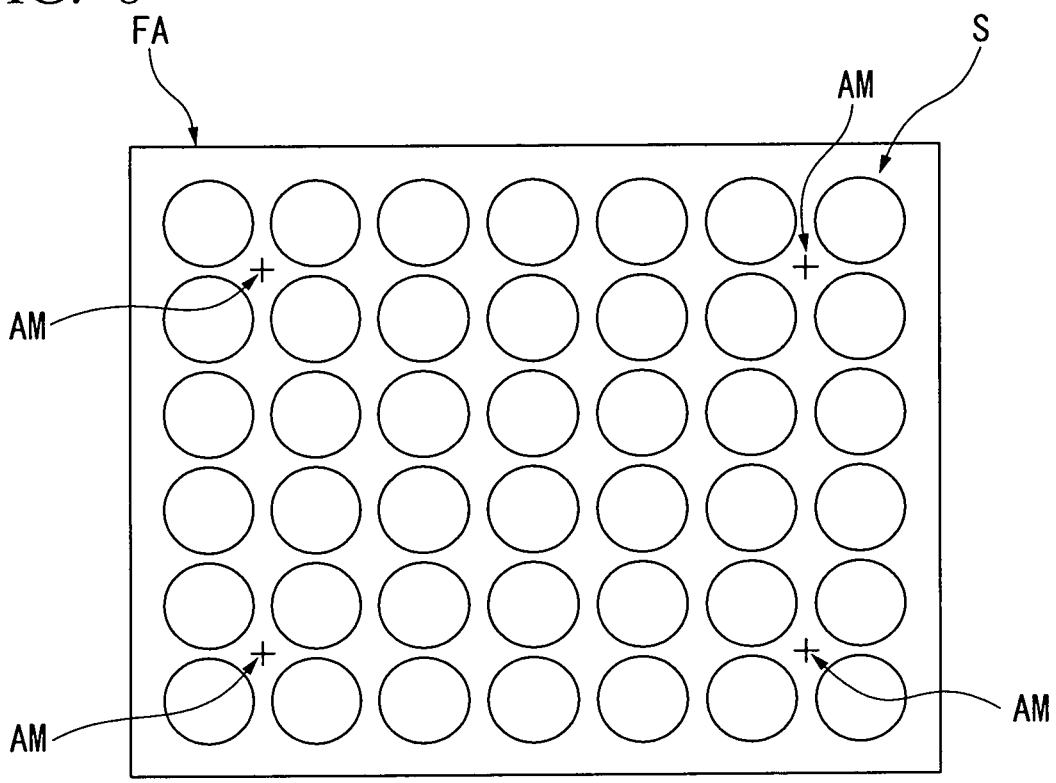
FIG. 8 is a diagram illustrating a field of view of a sensor 28A according to the first embodiment.

FIG. 8 is a diagram illustrating an example of a bright field image. The bright field image is an image generated on the basis of the bright field data. Since biomolecules are formed in the spot, a reflectance of the spot with respect to the bright field light and a reflectance of the substrate with respect to the bright field light are different, and a luminance value of the spot and a luminance value of the substrate are different. Therefore, in the bright field image generated on the basis of the bright field data, an area corresponding to the spot is darker than an area corresponding to the substrate. As illustrated in FIG. 8, the bright field image is displayed so that all the spots S and all the alignment marks AM included in the first part of the biochip can be recognized.

Further, among the incident light including the bright field light, the first fluorescence, and the second fluorescence incident on the optical element 51, the first fluorescence is transmitted through the dichroic mirror 53, reflected by the dichroic mirror 54, guided to the imaging optical system 33B, and incident on the sensor 28B.

Figure 9:
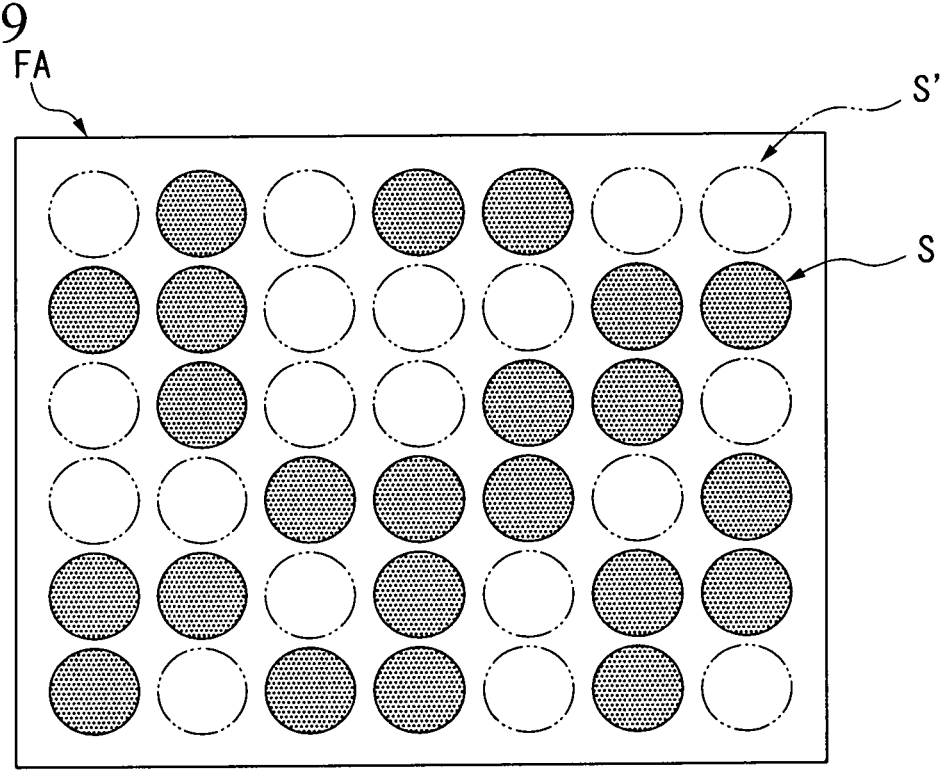
FIG. 9 is a diagram illustrating a field of view of a sensor 28B according to the first embodiment.

The image of the spot S at which the first fluorescence is generated is formed within the field of view FA of the sensor 28B, as illustrated in FIG. 9, similar to the measurement of the spot S using the bright field light. The sensor 28B acquires image information of the spot S at which the first fluorescence is generated (light reception information of the spot S).

Further, among the incident light including the bright field light, the first fluorescence, and the second fluorescence incident on the optical element 51, the second fluorescence is transmitted through the dichroic mirror 53, transmitted through the dichroic mirror 54, transmitted through the wavelength selection filter 42, guided to the imaging optical system 33C, and incident on the sensor 28C.

The image of the spot S at which the second fluorescence is generated is formed within the field of view FA of the sensor 28C, similar to the measurement of the spot S using the first excitation light. The sensor 28C acquires image information of the spot S at which the second fluorescence is generated (light reception information of the spot S).

Since the optical path lengths until the bright field light from the irradiation target 1, the first fluorescence, and the second fluorescence from the irradiation target are respectively incident on the sensors 28A, 28B, and 28C are the same, the bright field light, the first fluorescence, and the second fluorescence are simultaneously incident on the sensor 28A, the sensor 28B, and the sensor 28C and received at the same timing, respectively.

The sensor 28B images a first part which is part of the biochip using the first fluorescence to generate first fluorescence data (step S5). The sensor 28B receives first fluorescence emitted from the irradiation target 1 on the basis of the first excitation light emitted by the light source 31 to generate first fluorescence data. Therefore, the first fluorescence data includes position information and luminance information of the spot S at which the first fluorescence is generated among all the spots S included in the first part. The first fluorescence data generated by the sensor 28B is stored, for example, in the control section 22.

FIG. 9 is a diagram illustrating an example of a first fluorescence image. The first fluorescence image is an image that is generated based on the first fluorescence data. Therefore, in the first fluorescence image generated based on the first fluorescence data, an area corresponding to the spot S in which the first fluorescence is generated is brighter than the area corresponding to the substrate. As illustrated in FIG. 9, the first fluorescence image is displayed so that only the spot S at which the first fluorescence is generated among all the spots S included in the first part of the biochip can be recognized. A spot S' at which the first fluorescence is not generated (a spot indicated by a two-dot chain line in FIG. 9) among all the spot S included in the first part of the biochip cannot be recognized in the first fluorescence image.

The sensor 28C images a first part which is a part of a biochip using a second fluorescence and generates second fluorescence data, similar to the case in which the sensor 28B receives the first fluorescence (step S6). The sensor 28C receives a second fluorescence emitted from the irradiation target 1 on the basis of the second excitation light emitted by the light source 31 and generates second fluorescence data. Therefore, the second fluorescence data includes position information and luminance information of only the spot S in which the second fluorescence is generated among all spot S included in the first part. The second fluorescent data generated by the sensor 28C is stored, for example, in the control section 22.

The measuring apparatus 20 can measure an address in the irradiation target 1 of the spot S at which the first fluorescence is generated, that is, an address in the irradiation target 1 of the spot S at which substance of the probe and substance of the target are bonded, by associating a result of imaging the spot S using the bright field light (a bright field light result), which is illustrated in FIG. 8, with a result of imaging the spot S at which the first fluorescence is generated using the sensor 28B, which is illustrated in FIG. 9 (a fluorescence result). Similarly, the measuring apparatus 20 can measure an address in the irradiation target 1 of the spot S at which the second fluorescence is generated, that is, an address in the irradiation target 1 of the spot S at which substance of the probe and substance of the target are bonded, by associating a result of imaging the spot S using the bright field light (a bright field light result), which is illustrated in FIG. 8, with a result of imaging the spot S at which the second fluorescence is generated using the sensor 28C (a fluorescence result).

In this case, in the image measurement of the spot S using the bright field light, the image measurement of the spot S using the first fluorescence, the image measurement of the spot S using the second fluorescence, an optical path length from the light source 31 to the sensor 28A in the bright field light is the same as an optical path length from the light source 31 to the irradiation target 1 in the first excitation light, an optical path length from the irradiation target 1 to the sensor 28B in the first fluorescence generated due to the irradiation of the first excitation light, and an optical path length from the light source 31 to the irradiation target 1 in the second excitation light, and an optical path length from the irradiation target 1 to the sensor 28C in the second fluorescence generated due to the irradiation of the second excitation light. Therefore, a result of imaging the spot S using bright field light, a result of imaging the spot S at which the first fluorescence is generated, and a result of imaging the spot S at which the second fluorescence is generated are associated in a state in which adverse effects caused by a time of a difference between the optical path lengths is suppressed.

If the measurement of the first part in the irradiation target 1 is completed, the control section 22 of the measuring apparatus 20 determines whether imaging of all parts (from the first part to the fourth part) of the irradiation target 1 has been completed (step S7). In a case in which a part not subjected to an imaging process remains in the irradiation target 1, the control section 22 repeatedly executes steps S1 and S6 until all parts from the first part to the fourth part are imaged. In this case, the control section 22 moves the irradiation target 1 through the stage 26 so as to image a part adjacent to the part for which an imaging process is completed. Here, the part to be newly subjected to the imaging process is set as a position at which a portion of the imaged alignment mark AM is imaged in the field of view FA of the sensor 28 in an immediately previous imaging process. The measuring apparatus 20 performs measurement of the spot S and the alignment mark AM using the bright field light, and measurement of the spot S using the first fluorescence and the second fluorescence, as in the imaging process for the first part. The bright field data, the first fluorescence data, and the second fluorescence data generated at each part are stored, for example, in the control section 22 for each part.

In the imaging process described above, since the light amount of the bright field light is larger than the light amount of first fluorescence and the light amount of the second fluorescence, a time required for measurement using the bright field light is shorter than a time required for measurement using the first fluorescence or a time required for measurement using the second fluorescence, and the measurement using the bright field light is completed earlier than the measurement using the first fluorescence and the measurement using the second fluorescence.

Figure 10:
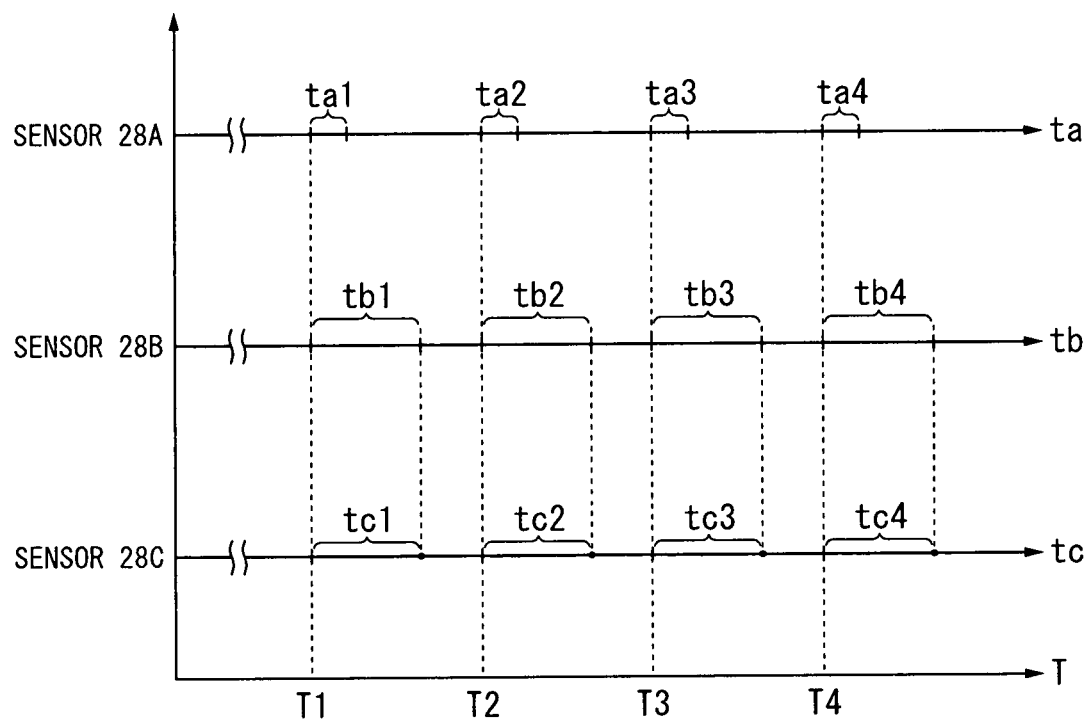
FIG. 10 illustrates a timing chart of sensors 28A, 28B and 28C related to measurement.

FIG. 10 is a timing chart of the sensors 28A, 28B, and 28C according to measurement of a biochip which is the irradiation target 1.

IN a time T illustrated in FIG. 10, a time T1 is, for example, an imaging start time of the first part.

Time T2 is, for example, an imaging start time of the second part. Time T3 is, for example, an imaging start time of the third part. Time T4 is, for example, an imaging start time of the fourth part. In FIG. 10, it is assumed that an imaging time ta1 taken for the first part in the sensor 28A, an imaging time ta2 taken for the second part in the sensor 28A, an imaging time ta3 taken for the third part in the sensor 28A, and an imaging time ta4 taken for the fourth part in the sensor 28A are the same. It is assumed that an imaging time tb1 taken for the first part in the sensor 28B, an imaging time tb2 taken for the second part in the sensor 28B, an imaging time tb3 taken for the third part in the sensor 28B, and an imaging time tb4 taken for the fourth part in the sensor 28B are the same. It is assumed that an imaging time tc1 taken for the first part in the sensor 28C, an imaging time tc2 taken for the second part in the sensor 28C, an imaging time tc3 taken for the third part in the sensor 28C, and an imaging time tc4 taken for the fourth part in the sensor 28C are the same. In addition, the imaging time ta1 is assumed to be shorter than each of the imaging time tb1 and the imaging time tc1. The imaging time ta2 is assumed to be shorter than each of the imaging time tb2 and the imaging time tc2. The imaging time ta3 is assumed to be shorter than each of the imaging time tb3 and the imaging time tc3. The imaging time ta4 is assumed to be shorter than each of the imaging time tb4 and the imaging time tc4.

As illustrated in FIG. 10, the imaging time ta1 in the sensor 28A is shorter than an imaging time of the imaging time tb1 in the sensor 28B. The imaging time ta1 in the sensor 28A is shorter than an imaging time of the imaging time tc1 in the sensor 28C. Therefore, after the imaging of the first part in the sensor 28A is completed, for example, calibration according to the measurement of the bright field light can be performed using a time of a difference between the imaging time ta1 and the imaging time tb1 or a time of a difference between the imaging time ta1 and the imaging time tc1.

Similarly, the imaging time ta2 in the sensor 28A is shorter than an imaging time of the imaging time tb2 in the sensor 28B. The imaging time ta2 in the sensor 28A is shorter than an imaging time of the imaging time tc2 in the sensor 28C. Therefore, after the imaging of the second part in the sensor 28A is completed, for example, calibration according to the measurement of the bright field light can be performed using a time of a difference between the imaging time ta2 and the imaging time tb2 or a time of a difference between the imaging time ta2 and the imaging time tc2.

Similarly, the imaging time ta3 in the sensor 28A is shorter than an imaging time of the imaging time tb3 in the sensor 28B. The imaging time ta3 in the sensor 28A is shorter than an imaging time of the imaging time tc3 in the sensor 28C. Therefore, after the imaging of the third part in the sensor 28A is completed, for example, calibration according to the measurement of the bright field light can be performed using a time of a difference between the imaging time ta3 and the imaging time tb3 or a time of a difference between the imaging time ta3 and the imaging time tc3.

Similarly, the imaging time ta4 in the sensor 28A is shorter than an imaging time of the imaging time tb4 in the sensor 28B. The imaging time ta4 in the sensor 28A is shorter than an imaging time of the imaging time tc4 in the sensor 28C. Therefore, after the imaging of the fourth part in the sensor 28A is completed, for example, calibration according to the measurement of the bright field light can be performed using a time of a difference between the imaging time ta4 and the imaging time tb4 or a time of a difference between the imaging time ta4 and the imaging time tc4. For example, the calibration performed in the time of the difference (free time) is not performed for each part, but a procedure of performing the calibration once per biochip may be adopted.

Figure 11:
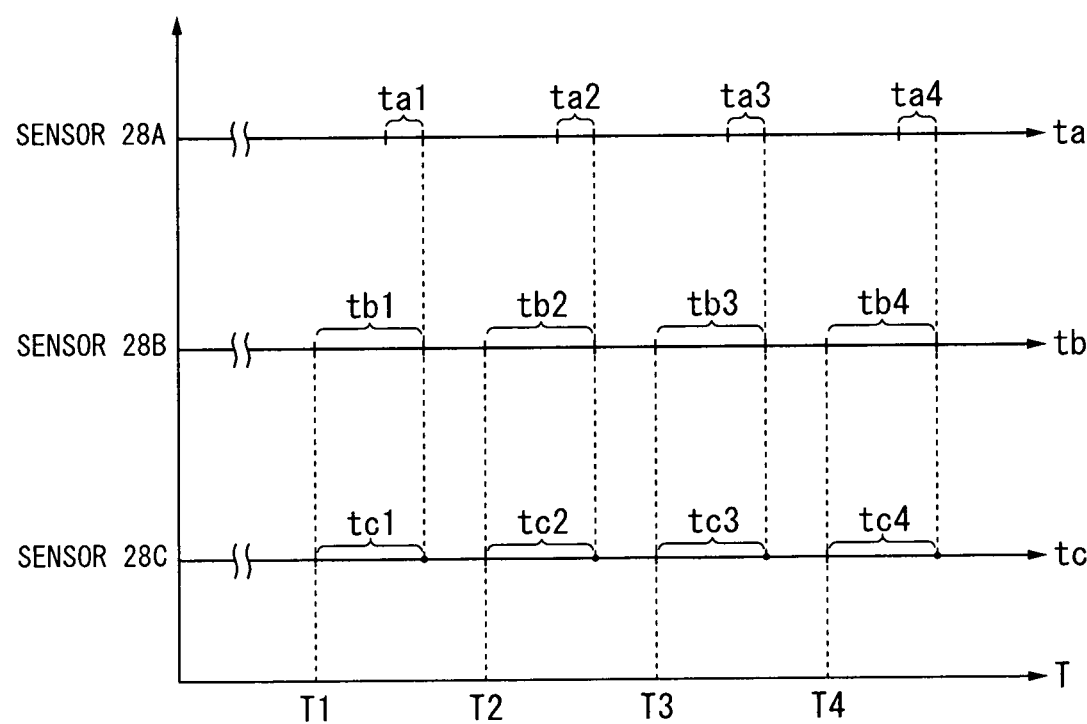
FIG. 11 illustrates a timing chart of sensors 28A, 28B and 28C related to measurement.

An imaging start timing in the sensor 28A may be a timing at which imaging processes in the sensor 28A, the sensor 28B, and the sensor 28C are simultaneously completed, as illustrated in FIG. 11. In this case, a free time of a difference between times required for imaging in the sensor 28A and the sensor 28B is formed before the start of imaging in the sensor 28A. Therefore, for example, it is possible to perform the imaging process in the sensor 28A after performing a calibration regarding the sensor 28A before the start of imaging in the sensor 28A, and to improve the measurement accuracy.

Figure 12:
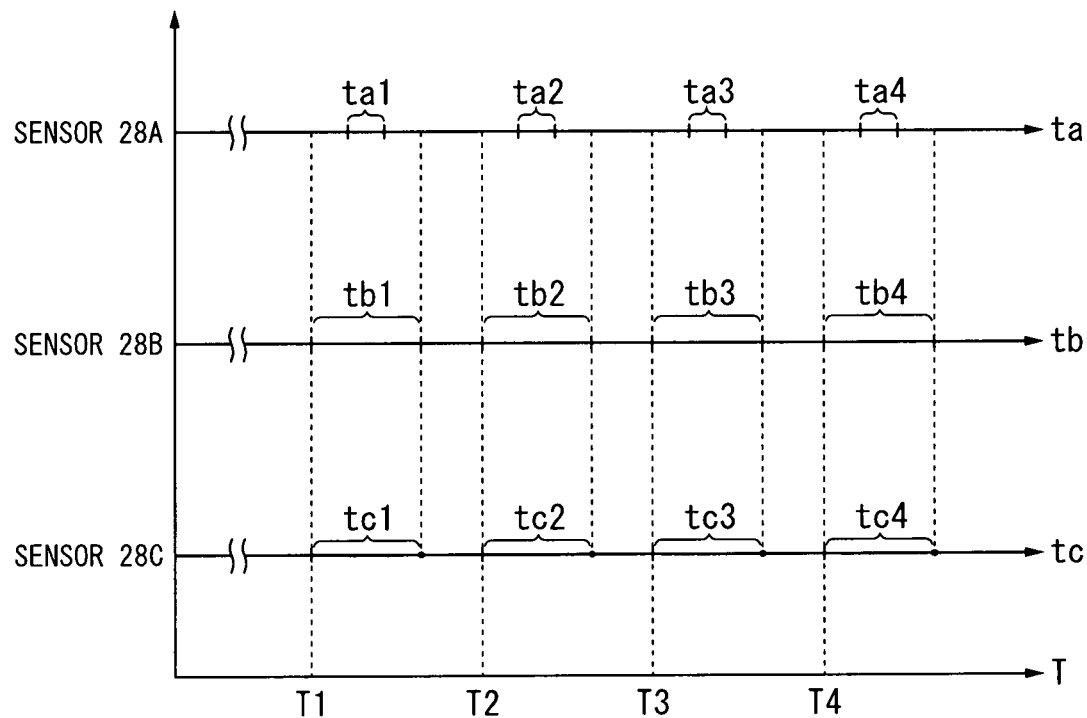
FIG. 12 illustrates a timing chart of sensors 28A, 28B and 28C related to measurement.

As illustrated in FIG. 12, the imaging process in the sensor 28A may be at an intermediate timing of the imaging process in the sensor 28B. Similarly, the imaging process in the sensor 28A may be at an intermediate timing of the imaging process in the sensor 28C. In this case, for example, even when the light amount of the excitation light may be unstable and the imaging process may be unstable in at least one of the imaging start and the imaging end in the sensor 28B and the sensor 28C, the imaging process in the sensor 28A is performed at an intermediate timing of the imaging process in sensor 28B and the imaging process in sensor 28C. Thus, it is possible to suppress an influence of such an unstable factor.

The imaging process by the sensor 28A may be performed in parallel with the imaging process by the sensor 28B and the image processing by the sensor 28C. Therefore, all of the imaging process by the sensor 28A may not be performed in parallel with the imaging process by the sensor 28B and the imaging process by sensor 28C, but a part of the imaging process by the sensor 28A may be performed in parallel with a part of the imaging process by the sensor 28B and a part of the image processing by the sensor 28C.

Figure 13:
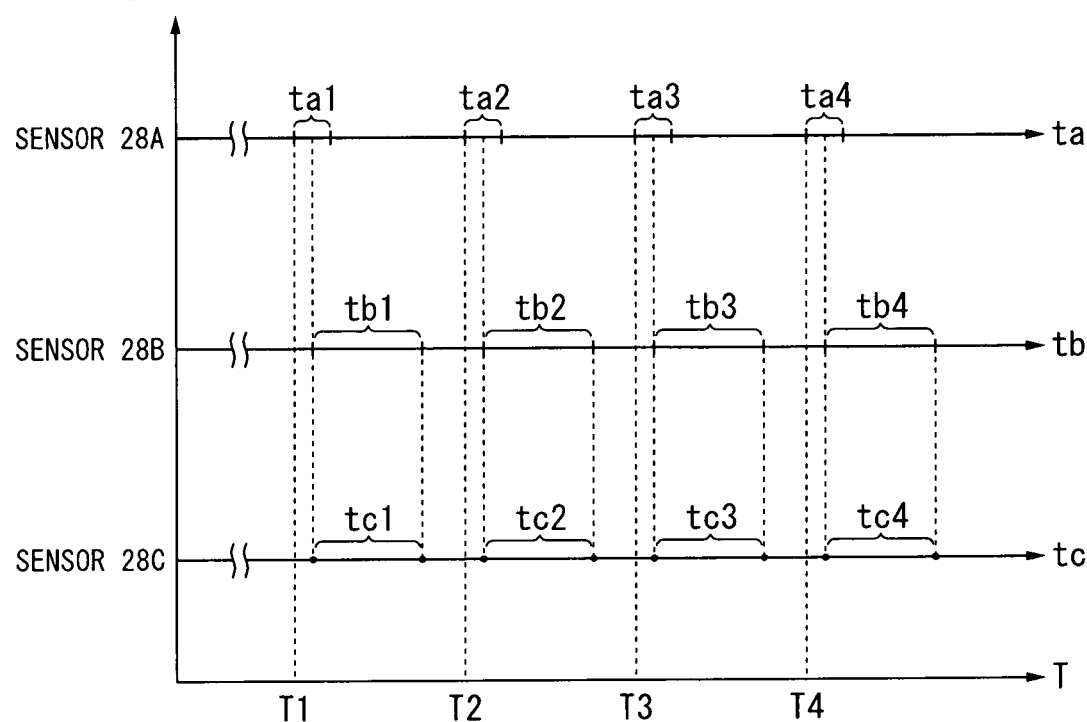
FIG. 13 illustrates a timing chart of sensors 28A, 28B and 28C related to measurement.

For example, as illustrated in FIG. 13, in a case in which the imaging process by the sensor 28A starts before the imaging process by the sensor 28B and the imaging process by the sensor 28C start, the imaging process by the sensor 28B and the imaging process by the sensor 28C start before the imaging process by the sensor 28A ends.

Figure 14:
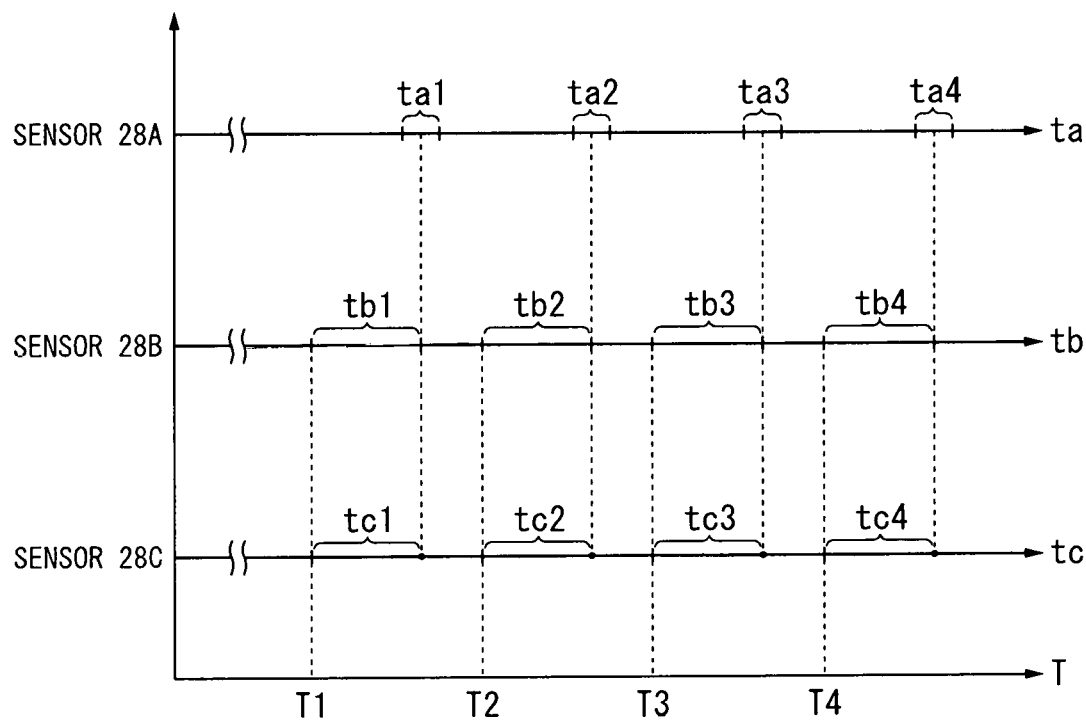
FIG. 14 illustrates a timing chart of sensors 28A, 28B and 28C related to measurement.

For example, as illustrated in FIG. 14, in a case in which the imaging process by the sensor 28B and the imaging process by the sensor 28C start before the imaging process by the sensor 28A starts, the imaging process by the sensor 28A starts before the imaging process by the sensor 28B and the imaging process by the sensor 28C end.

In a case in which there a difference between the imaging time in the sensor 28A and the imaging time in the sensor 28B with respect to a predetermined part or in a case in which there a difference between the imaging time in the sensor 28A and the imaging time in the sensor 28C with respect to a predetermined part, the sensor 28A may also perform the imaging process for the same part as a predetermined part imaged in a first imaging process again after the first imaging process for the predetermined part ends.

Figure 15:
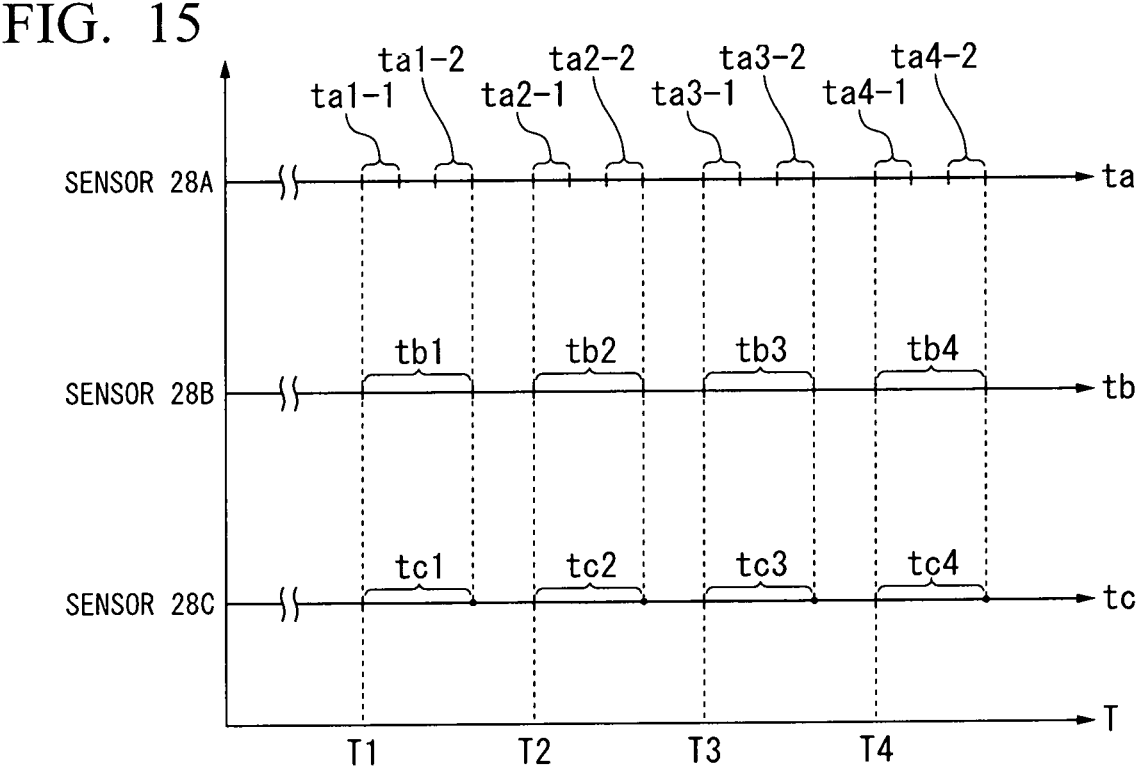
FIG. 15 illustrates a timing chart of sensors 28A, 28B and 28C related to measurement.

For example, as illustrated in FIG. 15, in the imaging time tb1 of the sensor 28B and the imaging time tc1 of the sensor 28C, the sensor 28A can perform imaging in an imaging time ta1-1 and an imaging time ta1-2 two times (in a case in which (imaging time ta1-1+imaging time ta1-2)≤(longer time among the imaging time tb1 and imaging time tc1)).

In the imaging time tb2 of the sensor 28B and the imaging time tc2 of the sensor 28C, the sensor 28A can perform imaging in an imaging time ta2-1 and an imaging time ta2-2 two times (in a case in which (imaging time ta2-1+imaging time ta2-2)≤(longer time among the imaging time tb2 and imaging time tc2)).

In the imaging time tb3 of the sensor 28B and the imaging time tc3 of the sensor 28C, the sensor 28A can perform imaging in an imaging time ta3-1 and an imaging time ta3-2 two times (in a case in which (imaging time ta3-1+imaging time ta3-2)≤(longer time among the imaging time tb3 and imaging time tc3)).

In the imaging time tb4 of the sensor 28B and the imaging time tc4 of the sensor 28C, the sensor 28A can perform imaging in an imaging time ta4-1 and an imaging time ta4-2 two times (in a case in which (imaging time ta4-1+imaging time ta4-2)≤(longer time among the imaging time tb4 and imaging time tc4)).

Figure 16:
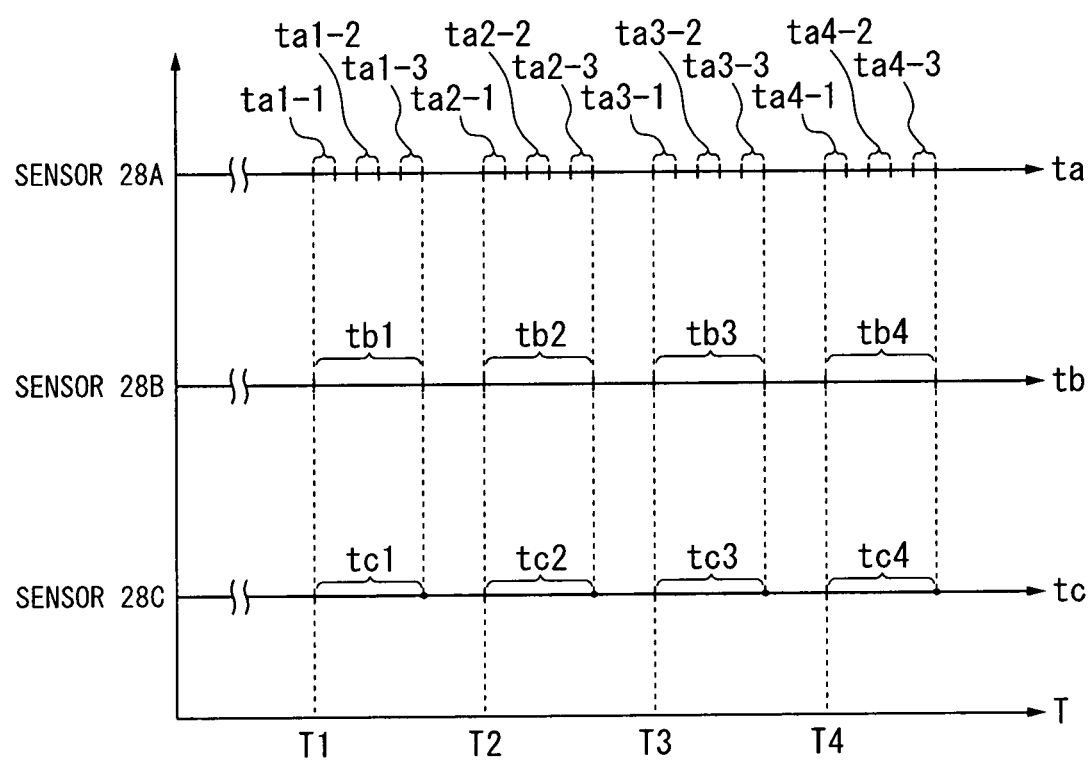
FIG. 16 illustrates a timing chart of sensors 28A, 28B and 28C related to measurement.

Further, as illustrated in FIG. 16, while the sensor 28B and the sensor 28C are imaging a predetermined part, the sensor 28A can perform imaging three times. For example, in the imaging time tb1 of the sensor 28B and the imaging time tc1 of the sensor 28C, the sensor 28A can perform imaging in an imaging time ta1-1, an imaging time ta1-2, and an imaging time ta1-3 three times (in a case in which (imaging time ta1-1+imaging time ta1-2+imaging time ta1-3)≤(longer time among the imaging time tb1 and imaging time tc1)).

In the imaging time tb2 of the sensor 28B and the imaging time tc2 of the sensor 28C, the sensor 28A can perform imaging in an imaging time ta2-1, an imaging time ta2-2, and an imaging time ta2-3 three times (in a case in which (imaging time ta2-1+imaging time ta2-2+imaging time ta2-3)≤(longer time among the imaging time tb2 and imaging time tc2)).

In the imaging time tb3 of the sensor 28B and the imaging time tc3 of the sensor 28C, the sensor 28A can perform imaging in an imaging time ta3-1, an imaging time ta3-2, and an imaging time ta3-3 three times (in a case in which (imaging time ta3-1+imaging time ta3-2+imaging time ta3-3)≤(longer time among the imaging time tb3 and imaging time tc3)).

In the imaging time tb4 of the sensor 28B and the imaging time tc4 of the sensor 28C, the sensor 28A can perform imaging in an imaging time ta4-1, an imaging time ta4-2, and an imaging time ta4-3 three times (in a case in which (imaging time ta4-1+imaging time ta4-2+imaging time ta4-3)≤(longer time among the imaging time tb4 and imaging time tc4)).

Thus, in a case in which imaging is performed on one part multiple times, it is possible to reduce error causes included in the imaging results each time through an averaging effect by averaging the plurality of obtained imaging results, and to improve measurement accuracy.

The control section 22 screen-combines measurement results of the spots S using the bright field light using the measurement result of the alignment mark AM in the bright field data of the first to fourth parts. The control section 22 obtains a relative position relationship when screen-combining the bright field data of the first to fourth parts, among a plurality of parts in which the same alignment mark AM is imaged (step S8). Using the obtained relative position relationship between the parts, the control section 22 screen-combines the first fluorescence data of the first to fourth parts and screen-combines the second fluorescence data of the first to fourth parts (step S9).

The control section 22 measures an address in the irradiation target 1 of the spot S at which substance of the probe and substance of the target are bonded (step S10) and ends the measurement of the irradiation target 1.

As described above, in this embodiment, since the dichroic mirror 39 has optical characteristic for reflecting the first excitation light and the second excitation light that are incident, transmitting the first fluorescence and the second fluorescence that are incident, and partially transmitting and partially reflecting the incident bright field light, it is possible to eliminate adverse effects of an optical path change or the like caused by switching the light emitted from the light source 31. Therefore, in this embodiment, it is possible to associate a measurement result using the bright field light and a measurement result using the fluorescence with high precision, and to suppress degradation of measurement accuracy of the spot S, as in a case in which the optical element arranged on the optical path is inserted or removed according to the wavelength band of the light.

In this embodiment, even in a case in which the bright field light, the first fluorescence, and the second fluorescence are simultaneously emitted from the filter block 37, the light is separated by the optical element 51 and optical element 52 according to the wavelength, and the separated light is respectively incident on the sensors 28A to 28C. Accordingly, it is possible to simultaneously perform measurement using the bright field light, the first fluorescence, and the second fluorescence, and to shorten the measurement time as compared with the case in which each light is sequentially measured. Further, in this embodiment, since the optical path lengths until the bright field light, the first fluorescence, and the second fluorescence are respectively incident on the sensors 28A to 28C are the same, it is possible to obtain a measurement result while suppressing adverse effects caused by the difference between the optical path lengths.

In this embodiment, since the optical characteristics of the multilayer film included in the dichroic mirror 39 are set, it is possible to easily express the optical characteristics for reflecting the first and second excitation light, transmitting the first and second fluorescence generated due to the irradiation of the first and second excitation light, and partially transmitting and partially reflecting the bright field light by configuring a film having the optical characteristics on two surfaces. According to this embodiment, it is possible to speed up the measuring operation. In this embodiment, it is possible to achieve improvement of measurement accuracy through, for example, adjustment of the amount of light output by the light source 31 or setting of exposure time of the sensors 28A and 28B and the sensor 28C by receiving, using the sensor 55, the bright field light emitted from the light source 31 and incident on the dichroic mirror 39, and not directed to the irradiation target 1.

<Second Embodiment>

A second embodiment of an optical apparatus and a measuring apparatus will be described with reference to FIG. 17.

Figure 17:
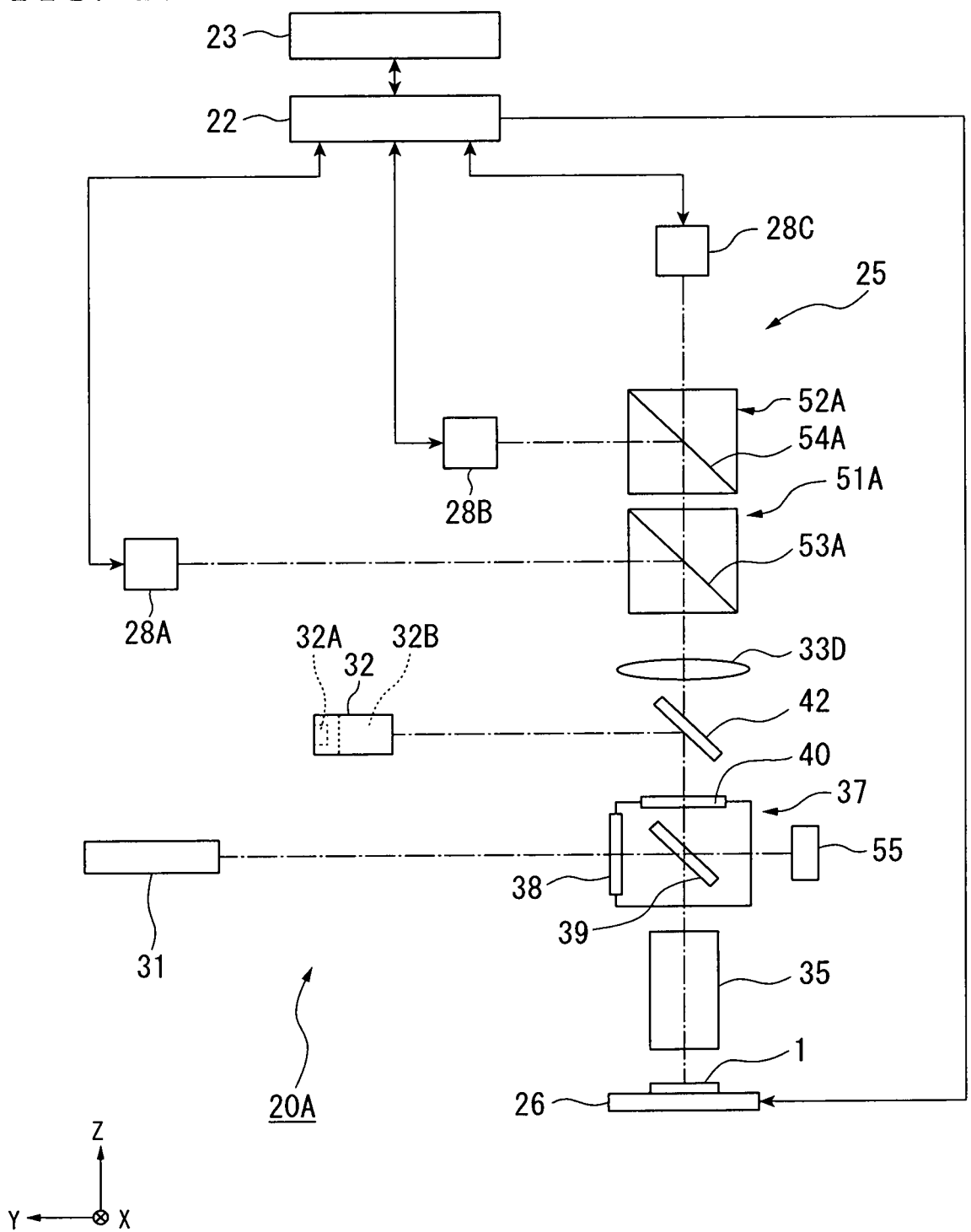
FIG. 17 is a schematic block diagram illustrating an example of a measuring apparatus according to a second embodiment.

In FIG. 17, the same components as those in the first embodiment illustrated in FIGS. 1 to 16 are denoted with the same reference numerals, and description thereof is omitted.

FIG. 17 is a schematic configuration diagram illustrating an example of a measuring apparatus 20A according to the second embodiment.

The measuring apparatus 20A includes an optical element 51A and an optical element 52A so as to separate light from the filter block 37 according to a wavelength of the light. Further, the measuring apparatus 20A includes an imaging optical system 33D arranged between the filter block 37 and the optical element 51A on the optical path of the light from the filter block 37. The optical element 51A and the optical element 52A are arranged on the image side of the imaging optical system 33D on the optical path. The wavelength selection filter 42 in the measuring apparatus 20A is arranged between the filter block 37 and the imaging optical system 33D in the optical path of the light from the filter block 37.

The optical element 51A includes a dichroic prism in which a wavelength separation film (second separation section) 53A is provided. The wavelength separation film 53A mainly separates the bright field light and the fluorescence. The wavelength separation film 53A has the same transmittance with respect to the wavelength of light as the dichroic mirror 53 described above. The wavelength separation film 53A guides the bright field light incident via the imaging optical system 33D to an optical path (second optical path) directed to the sensor 28A and guides the fluorescence to an optical path (first optical path) directed to the optical element 52A. For example, the wavelength separation film 53A reflects the bright field light and transmits the first fluorescence and the second fluorescence. A wavelength separation film that reflects the first fluorescence and the second fluorescence and transmits the bright field light may be used in place of the wavelength separation film 53A. In this case, the measuring apparatus 20 is configured so that the first fluorescence and the second fluorescence reflected by the wavelength separation film is directed to the optical element 52A and the bright field reflected by light wavelength separation film is directed to the sensor 28A.

The light transmitted through the optical element 51A via the irradiation target 1 is incident on the optical element 52A. The optical element 52A is a separation optical element that mainly separates a plurality of fluorescence having different wavelengths.

The optical element 52A includes a dichroic prism in which a wavelength separation film (third separation section) 54A is provided. The wavelength separation film 54A mainly separates the first fluorescence and the second fluorescence.

The wavelength separation film 54A has the same transmittance with respect to the wavelength of light as that of the dichroic mirror 54 as described above. The wavelength separation film 54A guides the first fluorescence to the optical path directed to the sensor 28B, and guides the second fluorescence to the optical path directed to the sensor 28C. For example, the wavelength separation film 54A reflects the first fluorescence and transmits the second fluorescence. A wavelength separation film that transmits the first fluorescence and reflects the second fluorescence may be used in place of the wavelength separation film 54A. In this case, the measuring apparatus 20 is configured so that the second fluorescence reflected by the wavelength separation film is directed to the sensor 28C and the first fluorescence transmitted by the wavelength separation film is directed to the sensor 28B.

The sensor 28A is arranged near a position in which the image of the irradiation target 1 is formed by the imaging optical system 33D via the reflection in the wavelength separation film 53A. The sensor 28B is arranged near a position in which the image of the irradiation target 1 is formed by the imaging optical system 33D via the reflection in the wavelength separation film 54A. The sensor 28C is arranged near a position in which the image of the irradiation target 1 is formed by the imaging optical system 33D via the transmission in the wavelength separation film 54A.

Other configurations are the same as those in the first embodiment.

In the measuring apparatus 20A having the above configuration, the bright field light emitted from the light source 31 is transmitted through the first filter 38, separated into reflected light (partially reflected light) and transmitted light (partially transmitted light) by the dichroic mirror 39, and partially reflected and partially transmitted. The partially reflected bright field light is transmitted through the objective lens 35 and illuminates the surface 18 of the irradiation target 1. The bright field light reflected by the surface 18 of the irradiation target 1 is transmitted through the objective lens 35, partially transmitted through the dichroic mirror 39, transmitted through the second filter 40, transmitted through the wavelength selection filter 42, guided to the imaging optical system 33D, and incident on the optical element 51A. In the measuring apparatus 20A, the first excitation light emitted from the light source 31 is transmitted through the first filter 38, reflected by the dichroic mirror 39, and transmitted through the objective lens 35. Then, the first excitation light illuminates the surface 18 of the irradiation target 1. In the spot S at which substance of the probe (biomolecule) and substance of the target (specimen) are bonded among the spots S irradiated with the first excitation light, the first fluorescence generated at a wavelength included in the wavelength band λB12B (λB12F) is transmitted through the objective lens 35, transmitted through the dichroic mirror 39 of the filter block 37, transmitted through the second filter 40, transmitted through the wavelength selection filter 42, guided to the imaging optical system 33D, and incident on the optical element 51A. In the measuring apparatus 20A, the second excitation light emitted from the light source 31 is transmitted through the first filter 38, reflected by the dichroic mirror 39, and transmitted through the objective lens 35. Then, the second excitation light illuminates the surface 18 of the irradiation target 1. In the spot S at which substance of the probe (biomolecule) and substance of the target (specimen) are bonded among the spots S irradiated with the second excitation light, the second fluorescence generated at a wavelength included in the wavelength band λB22B (λB22F) is transmitted through the objective lens 35, transmitted through the dichroic mirror 39 of the litter block 37, transmitted through the second filter 40, transmitted through the wavelength selection filter 42, guided to the imaging optical system 33D, and incident on the optical element 51A.

Among the incident light including the bright field light, the first fluorescence, and the second fluorescence incident on the optical element 51A, the bright field light is reflected by the wavelength separation film 53A and then incident on the sensor 28A. The sensor 28A generates the above-described bright field data using the incident bright field light. Among the incident light including the bright field light, the first fluorescence, and the second fluorescence incident on the optical element 51A, the first fluorescence is transmitted through the wavelength separation film 53A and reflected by the wavelength separation film 54A, and then incident on the sensor 28B. The sensor 28B generates the above-described first fluorescence data using the first incident fluorescence. Among the incident light including the bright field light, the first fluorescence, and the second fluorescence incident on the optical element 51A, the second fluorescence is transmitted through the wavelength separation film 53A and transmitted through the wavelength separation film 54A, and then incident on the sensor 28C. The sensor 28C generates the above-described second fluorescence data using the second incident fluorescence.

As described above, the control section 22 can measure each of an address in the irradiation target 1 of the spot S at which the first fluorescence is generated and an address in the irradiation target 1 of the spot S at which the second fluorescence is generated using the bright field data, the first fluorescence data, and the second fluorescence data (a result of screen-combining the bright field data, the first fluorescence data, and the second fluorescence data of respective parts in a case in which the biochip is divided into a plurality of parts and imaging is performed). In a case in which a difference among imaging times of the sensors 28A, the sensor 28B, and the sensor 28C, the control section 22 performs, for example, a calibration according to the measurement of the bright-field light using a differential time.

Thus, in this embodiment, since the dichroic prism is arranged as an optical element for separating the bright field light, the first fluorescence, and the second fluorescence on the image surface side of the imaging optical system 33D, it is possible to suppress aberration such as chromatic aberration.

The first embodiment and the second embodiment described above may be modified as follows.

Figure 19:
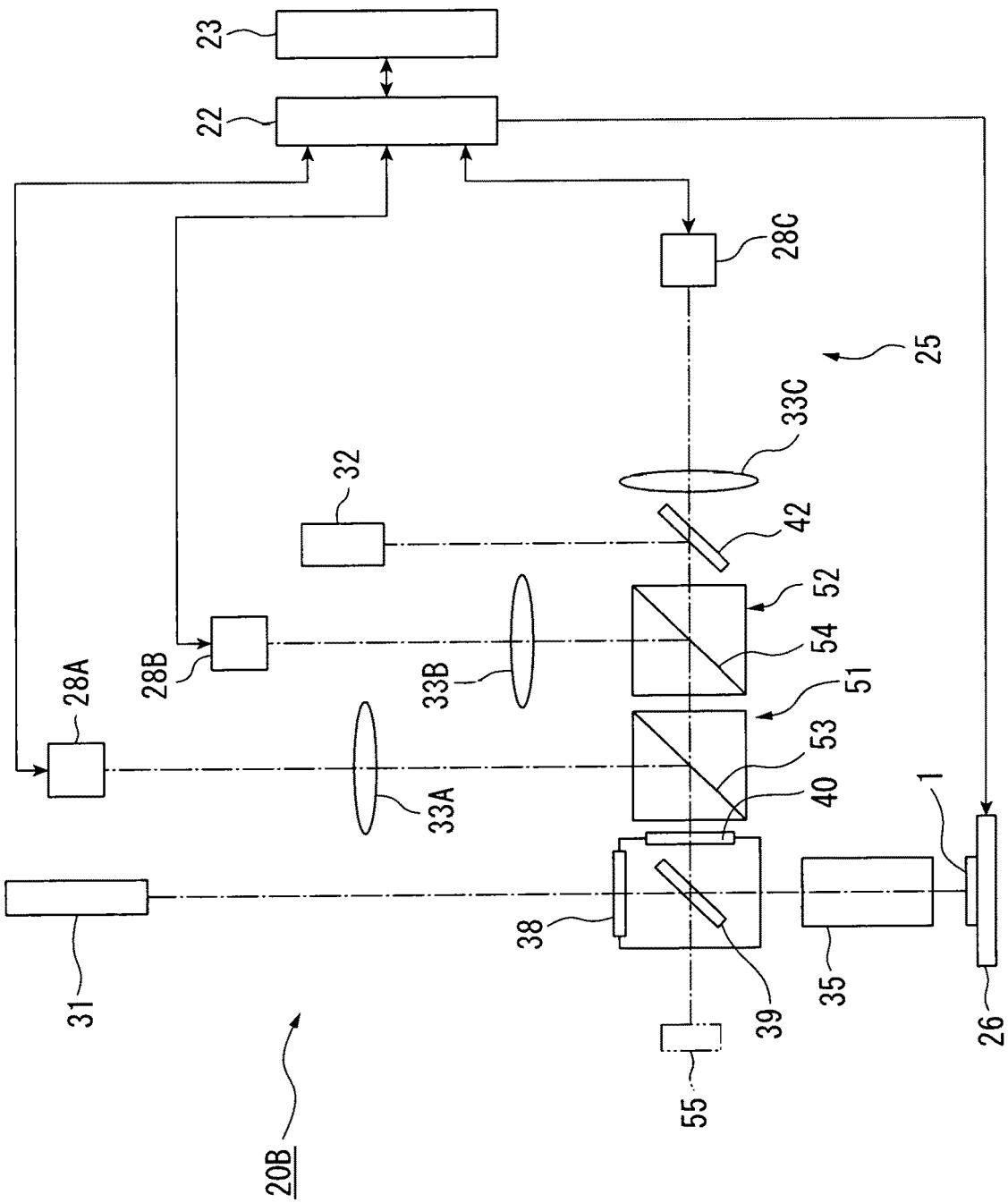
FIG. 19 is a schematic block diagram illustrating an example of a measuring apparatus according to another embodiment.

For example, the configuration in which the first excitation light and the second excitation light are reflected in the dichroic mirror 39, the irradiation target 1 is illuminated by the light, and then, the first fluorescence and the second fluorescence generated by the irradiation target 1 are transmitted through the dichroic mirror 39 has been illustrated in the first embodiment and the second embodiment described above, but the present invention is not limited thereto, and a relationship of the reflection and the transmission of the first excitation light, the second excitation light, the first fluorescence, and the second fluorescence in the dichroic mirror 39 may be reversed. For example, a configuration in which the first excitation light and the second excitation light are transmitted through the dichroic mirror 39, and then illuminate the irradiation target 1, and the first fluorescence and the second fluorescence generated in the irradiation target 1 are reflected by the dichroic mirror 39 in a case in which the measuring apparatus 20B in which the optical apparatus 25 is arranged in a Y direction (horizontal direction) is used, as illustrated in FIG. 19, may be adopted.

In this case, the dichroic mirror 39 may be configured to have, for example, a transmittance between 35% to 65% (for example, a transmittance of 50%) with respect to the wavelength band $\lambda B31B$ and the wavelength band $\lambda B32B$ described above. The dichroic mirror 39 may be configured to have, for example, a transmittance between 75% to 100% (for example, a transmittance of 100%) with respect to the wavelength band $\lambda B11B$ described above. The dichroic mirror 39 may be configured to have, for example, a transmittance between 0% to 25% (for example, a transmittance of 0%) with respect to the wavelength band $\lambda B12B$ described above. The dichroic mirror 39 may be configured to have, for example, a transmittance between 75% to 100% (for example, a transmittance of 100%) with respect to the wavelength band $\lambda B21B$ described above. The dichroic mirror 39 may be configured to have, for example, a transmittance between 0% to 25% (for example, a transmittance of 0%) with respect to the wavelength band $\lambda B22B$ described above. The dichroic mirror 39 may be configured to have, for example, a transmittance between 0% to 25% (for example, a transmittance of 0%) with respect to the wavelength band $\lambda B4B$ described above.

The first multilayer film provided in the dichroic mirror 39 may be configured to have, for example, a transmittance between 40% to 60% (for example, a transmittance of 50%) with respect to the wavelength band $\lambda B31F$ and the wavelength band $\lambda B32F$ described above. The first multilayer film may be configured to have, for example, a transmittance between 80% to 100% (for example, a transmittance of 100%) with respect to the wavelength band $\lambda B11F$ described above. The first multilayer film may be configured to have, for example, a transmittance between 0% to 20% (for example, a transmittance of 0%) with respect to the wavelength band $\lambda B12F$ described above. The first multilayer film may be configured to have, for example, a transmittance between 80% to 100% (for example, a transmittance of 100%) with respect to the wavelength band $\lambda B21F$ described above. The first multilayer film may be configured to have, for example, a transmittance between 0% to 20% (for example, a transmittance of 0%) with respect to the wavelength band $\lambda B22F$ described above. The first multilayer film may be configured to have, for example, a transmittance between 0% to 20% (for example, a transmittance of 0%) with respect to the wavelength band $\lambda B4F$ described above. Further, a transmittance of the second multilayer film provided in the dichroic mirror 39 may be the same transmittance as the transmittance illustrated in FIG. 5B.

Thus, the optical characteristics of the dichroic mirror 39 can be appropriately arbitrarily set according to a device configuration or the like.

Further, the configuration in which, in the optical apparatus 25, the incident light including the bright field light, the first fluorescence, and the second fluorescence is first separated into the light including the first fluorescence and the light including the bright field light by the optical element 51 (51A), and then, separated into the light including the first fluorescence and the light including the second fluorescence by the optical element 52 (52A) has been illustrated in the first embodiment and the second embodiment described above, but the present invention is not limited thereto. For example, a configuration in which, in the optical apparatus 25, the incident light including the bright field light, the first fluorescence, and the second fluorescence is first separated into the light including the bright field light and the first fluorescence and the light including the second fluorescence by the optical element 52 (52A), and then, separated into the light including the bright field light and the light including the first fluorescence by the optical element 51 (51A) may be adopted. Further, the optical element and the optical apparatus may be configured so that the incident light including the bright field light, the first fluorescence, and the second fluorescence is first separated into the light including the bright field light and the second fluorescence and the light including the first fluorescence by the optical element, and then, separated into the light including the bright field light and the light including the second fluorescence by the optical element.

Further, the case in which the bright field light, the first excitation light, and the second excitation are emitted by the light source 31 and fluorescence measurement is performed using the first fluorescence and the second fluorescence has been illustrated in the first embodiment and the second embodiment described above, but the present invention is not limited thereto. For example, a configuration in which the bright field light and the first excitation are emitted by the light source 31 and the fluorescence measurement is performed using the first fluorescence may be adopted. In this case, the optical element 52 (52A), the imaging optical system 33C, and the sensor 28C may not be provided, and the light source 31 may not emit the second excitation light.

Further, for example, a configuration in which a light source that can be controlled to individually emit the bright field light, the first excitation light, and the second excitation light is used may be adopted in place of the configuration in which a light source that can be controlled to simultaneously emit the bright field light, the first excitation light, and the second excitation light is used as the light source 31.

Further, although the configuration in which the optical sensor 28A, the sensor 28B, and the sensor 28C simultaneously receive the light from the irradiation target 1 has been adopted in the above embodiment, for example, the configuration in which the optical sensor 28A, the sensor 28B, and the sensor 28C sequentially chronologically receive the light from the irradiation target 1 may be adopted, in addition to such a configuration.

Further, in the first embodiment and the second embodiment described above, the dichroic mirror 39 may include a dichroic prism.

Further, although the dichroic mirror 39 has been described as having the transmittance between 35% to 65% with respect to the bright field light in the first embodiment and the second embodiment described above, the dichroic mirror 39 may have characteristics for partially reflecting and partially transmitting the bright field light. For example, the dichroic mirror 39 may have a transmittance of 5%, 10%, 15%, 20%, 25%, 30%, 70%, 75%, 80%, 85%, 90%, or 95% with respect to the bright field light. For example, in addition to the characteristics for partial transmitting and partial reflecting the bright field light, the dichroic mirror 39 may have characteristic that the transmittance with respect to the bright field light is higher than the transmittance with respect to the excitation light.

Further, in the first embodiment described above, the dichroic mirror 53 may include a dichroic prism (for example, having a wavelength separation film that separates the bright field light and the fluorescence.).

In the first embodiment described above, the dichroic mirror 54 may include a dichroic prism (for example, having a wavelength separation film that separates a plurality of fluorescence having different wavelengths).

In the second embodiment described above, the dichroic prism in which the wavelength separation film 53A is provided may include a dichroic mirror.

In the second embodiment described above, the dichroic prism in which the wavelength separation film 54A is provided may include a dichroic mirror.

<Measurement System (Screening Apparatus)>

Figure 18:
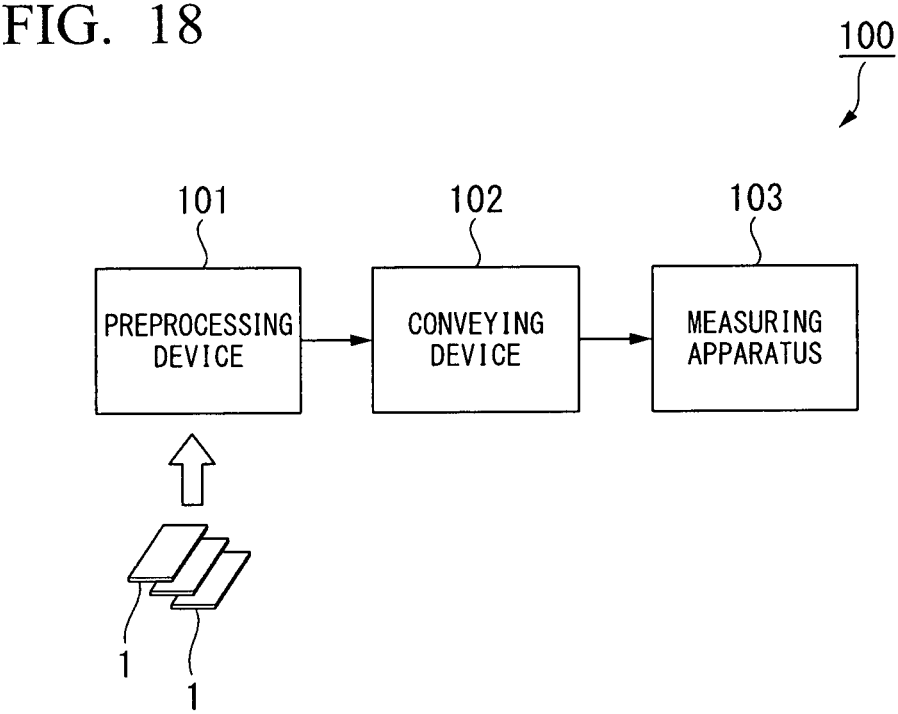
FIG. 18 is a diagram illustrating a measurement system (screening apparatus) according to an embodiment.

FIG. 18 is a diagram illustrating a measurement system (screening apparatus) including the above-described measuring apparatus 20, the above-described measuring apparatus 20A, or the above-described measuring apparatus 20B. The measurement system (screening apparatus) 100 illustrated in FIG. 18 includes a preprocessing section (bioassay device) 101, a conveying device 102, and a measuring apparatus 103.

The preprocessing device 101 is a bioassay device that prepares a measurement target of the irradiation target 1. For example, the preprocessing device is a device that injects a specimen (target) including a marked target into a probe (biomolecule) B arranged in the spot S and causes a specific reaction to occur in the biological molecule and the target. The preprocessing device 101 includes, for example, a stage device that supports the irradiation target 1 in which spots S are arranged in a matrix form, a dispensing device having a dispensing nozzle that injects a specimen into each spot S, and a cleaning device that cleans the irradiation target 1 after the specimen injection. In the preprocessing device 101, a drying device that dries the irradiation target 1 after cleaning may be provided. The preprocessing device 101 may be configured to process irradiation targets 1 one by one or may be configured to simultaneously process a plurality of irradiation targets.

The conveying device 102 is a conveying mechanism that conveys the irradiation target (biomolecule) 1 from the preprocessing device 101 to the measuring apparatus 103. As the conveying device 102, for example, a robot apparatus having a conveying arm may be used or a plate loader may be used. The conveying device 102 coveys the irradiation target 1 from the stage device of the preprocessing device 101 and conveys the irradiation target 1 into the measuring apparatus 103. In the conveying device 102, a mechanism for temporary standby until the irradiation target 1 conveyed from the preprocessing device 101 is conveyed into the measuring apparatus 103 may be provided.

The measuring apparatus 103 includes the above-described measuring apparatus 20, the above-described measuring apparatus 20A, or the above-described measuring apparatus 20B. The measuring apparatus 103 performs measurement of the irradiation target 1 arranged on the stage 26 by the conveying device 102. The measurement by the measuring apparatus 103 is as described in the measuring apparatus 20, the measuring apparatus 20A, or the measuring apparatus 20B. The conveying device 102 conveys the irradiation target 1 of which the measurement by the measuring apparatus 103 has ended from the stage 26, and conveys the irradiation target 1 to a predetermined position.

According to the above-described measurement system 100, it is possible to screen a biomolecule array that is performed in cooperation of preprocessing (bioassay) for the irradiation member 1 and the measurement process of the irradiation target 1 after the preprocessing.

The preferred embodiments according to the present invention have been described above with reference to the accompanying drawings, but it is understood that the present invention is not limited to the embodiments. Various shapes or combinations of the respective components shown in the above-described embodiments are merely examples, and various modifications are possible on the basis of design requirements or the like without departing from the spirit and the scope of the present invention.

REFERENCE SIGNS LIST

1: irradiation target, 20: measuring apparatus, 20A: measuring apparatus, 20B: measuring apparatus, 22: control section, 23: display section, 25: optical apparatus, 26: stage, 28A: sensor, 28B: sensor, 28C: sensor, 31: light source, 32: detection section, 32A: light source, 32B: sensor, 33A: imaging optical system, 33B: imaging optical system, 33C: imaging optical system, 33D: imaging optical system, 35: objective lens, 37: filter block, 38: first filter, 39: dichroic mirror, 40: second filter, 42: wavelength selection filter, 51: optical element, 51A: optical element, 52: optical element, 52A: optical element, 53: dichroic mirror, 53A: wavelength separation film, 54: dichroic mirror, 54A: wavelength separation film, 55: sensor, 100: measurement system, 101: preprocessing section, 102: conveying device, 103: measuring apparatus

The invention claimed is:
1. An optical apparatus, comprising:
   an objective lens,
   a light source configured to emit excitation light and bright field light,
   a first optical element configured to supply, through the objective lens, the excitation light and the bright field light to a target, and to receive, through the objective lens, fluorescent light from the target caused by the excitation light and the bright field light reflected from the target,
   a second optical element configured to receive, from the first optical element, incident light that includes the bright field light and the fluorescent light, and to separate the incident light into the bright field light and the florescent light according to a wavelength of the incident light,
   a first sensor configured to receive, through the objective lens and the second element, the bright field light, and to form a bright field image of the target from the received bright field light,
   a second sensor configured to receive, through the objective lens and the second element, the fluorescent light, wherein
      the first optical element includes a first dichroic mirror having first optical characteristics to
      reflect excitation light in a first wavelength band and transmit fluorescence light in a second wavelength band caused by the excitation light in the first wavelength band, or transmit the excitation light in the first wavelength band and reflect the fluorescence light in the second wavelength band caused by the excitation light in the first wavelength band, and
      partially transmit and partially reflect bright field light in a third wavelength band which is different from the first wavelength band and the second wavelength band, with a transmittance higher than a transmittance of the first wavelength band and lower than a transmittance of the second wavelength band, or with a transmittance higher than a transmittance of the second wavelength band and lower than a transmittance of the first wavelength band, and the second optical element includes a second dichroic mirror positioned so that light transmitted through or reflected by the first dichroic mirror and having two wavelength bands including the second wavelength band of the fluorescence light and the third wavelength band of the bright field light is incident thereon, the second dichroic mirror having second optical characteristics to separate the incident light into the fluorescence light in the second wavelength band and the bright field light in the third wavelength band, according to the wavelength, a third sensor configured to receive the bright field light emitted by the light source and transmitted through or reflected by the first dichroic mirror, and to output a signal corresponding to an amount of the bright field light received by the third sensor, and a controller configured to, when a measurement is being performed by the optical apparatus, adjust an amount of the excitation light emitted by the light source to thereby adjust an amount of the excitation light irradiating the target or set exposure times of the first sensor and the second sensor, based on the signal output by the third sensor.

2. The optical apparatus according to claim 1,
wherein the first dichroic mirror includes
a first multilayer film that
reflects the excitation light in the first wavelength band and transmits the fluorescence light in the second wavelength band, or
transmits the excitation light in the first wavelength band and reflects the fluorescence light in the second wavelength band, and
a second multilayer film that partially transmits and partially reflects the bright field light in the third wavelength band with the transmittance of the third wavelength band higher than the transmittance of the first wavelength band and lower than the transmittance of the second wavelength band.

3. The optical apparatus according to claim 1,
wherein the second optical element guides the excitation light in the first wavelength band or the florescence light in the second wavelength band included in the incident light to a first optical path, and guides the bright field light in the third wavelength band included in the incident light to a second optical path.

4. The optical apparatus according to claim 1, further comprising:
a third optical element which is provided in one optical path with the first optical element and the second optical element, wherein first dichroic mirror of the first optical element further having the first optical characteristics to
reflect excitation light in a fourth wavelength band and transmit fluorescence light in a fifth wavelength band caused by the excitation light in the fourth wavelength band, or
transmit the excitation light in the fourth wavelength band and reflect the fluorescence light in the fifth wavelength band,
the second dichroic mirror of the second optical element further having the second optical characteristics to
transmit the fluorescence light in the second wavelength band and the fluorescence light in the fifth wavelength band and reflect the bright field light in the third wavelength band, or reflect the fluorescence light in the second wavelength band and the fluorescence light in the fifth wavelength band and transmit the bright field light in the third wavelength band, and the third optical element includes a third separator to
reflect the fluorescence light in the second wavelength band and transmit the fluorescence light in the fifth wavelength band, or
transmit the fluorescence light in the second wavelength band and reflect the fluorescence light in the fifth wavelength band.

5. The optical apparatus according to claim 4, further comprising:
a fourth sensor,
a fourth optical element that guides focus detection light in a sixth wavelength band to the fourth sensor,
wherein the fourth optical element includes a fourth separator to
transmit the bright field light in the third wavelength band and reflect the focus detection light in the sixth wavelength band to guide the focus detection light to the fourth sensor, or
reflect the bright field light in the third wavelength band and transmit the focus detection light in the sixth wavelength band to guide the focus detection light to the fourth sensor.

6. The optical apparatus according to claim 4,
wherein the first dichroic mirror includes
a first multilayer film that
reflects the excitation light in the first wavelength band and transmits the fluorescence light in the second wavelength band, or
transmits the excitation light in the first wavelength band and reflects the fluorescence light in the second wavelength band; and
a second multilayer film that partially transmits and partially reflects the bright field light in the third wavelength band with the transmittance of the third wavelength band higher than the transmittance of the first wavelength band and lower than the transmittance of the second wavelength band.

7. The optical apparatus according to claim 4,
wherein the fluorescence light in the second wavelength band and the bright field light in the third wavelength band are simultaneously incident on the second optical element.

8. The optical apparatus according to claim 1, further comprising
a third optical element which is provided in one optical path with the first optical element and the second optical element,
wherein first dichroic mirror of the first optical element further having the first optical characteristics to
reflect excitation light in a fourth wavelength band and transmit fluorescence light in a fifth wavelength band, or
transmit the excitation light in the fourth wavelength band and reflect the fluorescence light in the fifth wavelength band,
the second dichroic mirror of the second optical element further having the second optical characteristics to
transmit the bright field light in the third wavelength band and the fluorescence light in the fifth wavelength band and reflect the fluorescence light in the second wavelength band, or
reflect the bright field light in the third wavelength band and the fluorescence light in the fifth wavelength band and transmit the fluorescence light in the second wavelength band, and the third optical element includes a third separator to
reflect the bright field light in the third wavelength band and transmit the fluorescence light in the fifth wavelength band, or transmit the bright field light in the third wavelength band and reflect the fluorescence light in the fifth wavelength band.

9. The optical apparatus according to claim 1, further comprising:

an imaging optical system that causes the bright field light to be formed as an image on the first sensor, which is provided in one optical path with the first optical element and the second optical element, wherein the second optical element is arranged on an image side relative to the imaging optical system on the optical path.

10. The optical apparatus according to claim 9, further comprising:

a third optical element arranged on the image side relative to the imaging optical system and the second optical element in the optical path, wherein the third optical element includes a third separator having third optical characteristics to separate light from the second optical element according to the wavelength.

11. The optical apparatus according to claim 9, wherein the second dichroic mirror of the second optical element further having second optical characteristics to cause light in one wavelength band among light in a plurality of wavelength bands from the first optical element to be emitted in a first direction and cause light in other wavelength bands to be emitted in a second direction, and a wavelength at which an emission direction of the light from the first optical element in the second optical characteristics is switched between the first direction and the second direction is a wavelength at which the first wavelength band and the second wavelength band in the first optical characteristics are switched.

12. The optical apparatus according to claim 9,
wherein the second dichroic mirror includes a multilayer film.

13. The optical apparatus according to claim 9,
wherein the first dichroic mirror separates the light incident in the third wavelength band into at least transmitted light and reflected light.

14. The optical apparatus according to claim 9,
wherein the first wavelength band and the second wavelength band are continuous wavelength bands.

15. The optical apparatus according to claim 9,
wherein a first light on a short wavelength side relative to a second light among the first light being incident in the first wavelength band and the second light being incident in the second wavelength band is incident on the first dichroic mirror earlier than the second light, and the second light is incident on the first dichroic mirror after the incidence of the first light.

16. The optical apparatus according to claim 9, further comprising:

a first wavelength selector that enables one of light in the first wavelength band and light in the second wavelength band, and light in the third wavelength band to be selectively incident on the first dichroic mirror.

17. The optical apparatus according to claim 9, further comprising:

a second wavelength selector capable of selectively transmitting one of light in the first wavelength band and light in the second wavelength band being incident on the first dichroic mirror and then emitted through the first dichroic mirror, and light in the third wavelength band.

18. A measuring apparatus, comprising:
the optical apparatus according to claim 1.

19. The measuring apparatus according to claim 18, further comprising:

an imaging optical system that is arranged in an optical path between the first optical element and the second optical element and forms the bright field image of the target on the first sensor.

20. The measuring apparatus according to claim 18, further comprising:

an imaging optical system that forms the bright field image of the target on the first sensor.

21. The measuring apparatus according to claim 18,
wherein the light source is capable of simultaneously emitting the excitation light and the bright field light.

22. The measuring apparatus according to claim 18, further comprising:

an optical information detection device on which light not directed to the target among light emitted from the light source and incident on the first optical element is incident, and that detects information on the light not directed to the target.

23. The measuring apparatus according to claim 22,
wherein the optical information detection device detects an light amount of the light incident on the optical information detection device.

24. The measuring apparatus according to claim 18, further comprising:

a controller that controls emission of the excitation light and the bright field light from the light source.

25. The measuring apparatus according to claim 24,
wherein the controller causes the excitation light and the bright field light to be simultaneously emitted from the light source.

26. The measuring apparatus according to claim 24,
wherein the controller performs control to change a light reception time of the first sensor according to a wavelength of the bright field light emitted from the light source.

27. A screening apparatus, comprising:
a bioassay device; and
the measuring apparatus according to claim 18.

28. A measuring method, comprising:
emitting light that illuminates an target through the optical apparatus according to claim 1.

29. The measuring method according to claim 28, further comprising:

receiving the light through the target individually for each wavelength at the same time.

30. The measuring method according to claim 28, further comprising:

simultaneously receiving first light and second light through the target.

31. The measuring method according to claim 28, further comprising:

chronologically receiving first light and second light through the target.

32. The measuring method according to claim 28, further comprising:

changing a light reception time of the first sensor according to a wavelength of the incident light.

33. A screening method, comprising:
performing bioassay using a biochip; and
measuring the biochip using the measuring method according to claim 28.

34. The optical apparatus according to claim 1, wherein the first dichroic mirror has a constant transmittance value with respect to the third wavelength band light in an entire wavelength band including the wavelength of the bright field light.

35. An optical apparatus comprising:
an objective lens;
a light source configured to emit excitation light in a first wavelength band and bright field light in a third wavelength band;
a first dichroic mirror;
a second dichroic mirror,
wherein the first dichroic mirror and the second dichroic mirror are configured in a first configuration or a second configuration, in the first configuration,
the first dichroic mirror is positioned and has optical characteristics to reflect the excitation light in a first wavelength band to an irradiation target on a stage so that the irradiation target generates fluorescence light in a second wavelength band,
transmit the fluorescence light generated by the irradiation target,
partially reflect, to the irradiation target, the bright field light in the third wavelength band, so that the bright field light is reflected by the irradiation target, and
partially transmit the bright field light reflected by the irradiation target,
wherein the first dichroic mirror has a transmittance for the third wavelength band that is higher than a transmittance of the first wavelength band and lower than a transmittance of the second wavelength band, and
the second dichroic mirror is positioned so that the fluorescence light transmitted by the first dichroic mirror and the bright field light transmitted by the first dichroic mirror are incident on the second dichroic mirror, and the second dichroic mirror has optical characteristics to separate the incident light into the fluorescence light and the bright field light, according to the wavelength, and in the second configuration, the first dichroic mirror is positioned and has optical characteristics to transmit the excitation light in a first wavelength band to an irradiation target so that the irradiation target generates the fluorescence light in the second wavelength band, reflect the fluorescence light generated by the irradiation target,
partially transmit, to the irradiation target, the bright field light in the third wavelength band, so that the bright field light is reflected by the irradiation target, and
partially reflect the bright field light reflected by the irradiation target, wherein the first dichroic mirror has a transmittance for the third wavelength band that is higher than a transmittance of the second wavelength band and lower than a transmittance of the first wavelength band, and
the second dichroic mirror is positioned so that the fluorescence light reflected by the first dichroic mirror and the bright field light reflected by the first dichroic mirror are incident on the second dichroic mirror, and the second dichroic mirror has optical characteristics to separate the incident light into the fluorescence light and the bright field light, according to the wavelength;
a first sensor configured to receive, through the objective lens and the second dichroic mirror, the bright field light, and to form a bright field image of the irradiation target from the received bight field light;
a second sensor configured to receive, through the objective lens and the second dichroic mirror, the fluorescent light;
a third sensor configured to receive the bright field light emitted by the light source and transmitted through or reflected by the first dichroic mirror, and to output a signal corresponding to an amount of the bright field light received by the third sensor; and
a controller configured to, when a measurement is being performed by the optical apparatus, adjust an amount of the excitation light emitted by the light source to thereby adjust an amount of the excitation light irradiating the target or set exposure times of the first sensor and the second sensor, based on the signal output by the third sensor.

* * * * *

UNITED STATES PATENT AND TRADEMARK OFFICE
CERTIFICATE OF CORRECTION

PATENT NO.         : 10,656,401 B2
APPLICATION NO.    : 15/100153
DATED              : May 19, 2020
INVENTOR(S)        : Susumu Mori et al.

Page 1 of 1

It is certified that error appears in the above-identified patent and that said Letters Patent is hereby corrected as shown below:

In the Claims

Column 44, Line 43:
Claim 1, delete "florescent" and insert -- fluorescent --, therefor.

Column 45, Line 43:
Claim 3, delete "florescence" and insert -- fluorescence --, therefor.

Column 50, Line 27:
Claim 35, delete "bight" and insert -- bright --, therefor.

Signed and Sealed this
Eleventh Day of August, 2020

Andrei Iancu
*Director of the United States Patent and Trademark Office*